United States Patent
Kim et al.

(10) Patent No.: US 12,213,173 B2
(45) Date of Patent: Jan. 28, 2025

(54) WIRELESS COMMUNICATION METHOD USING MULTI-LINK, AND WIRELESS COMMUNICATION TERMINAL USING SAME

(71) Applicant: WILUS INSTITUTE OF STANDARDS AND TECHNOLOGY INC., Gyeonggi-do (KR)

(72) Inventors: Sanghyun Kim, Gyeonggi-do (KR); Geonjung Ko, Gyeonggi-do (KR); Juhyung Son, Gyeonggi-do (KR); Jinsam Kwak, Gyeonggi-do (KR)

(73) Assignee: WILUS INSTITUTE OF STANDARDS AND TECHNOLOGY INC., Gyeonggi-Do (KR)

( * ) Notice: Subject to any disclaimer, the term of this patent is extended or adjusted under 35 U.S.C. 154(b) by 0 days.

(21) Appl. No.: 18/534,621

(22) Filed: Dec. 9, 2023

(65) Prior Publication Data

US 2024/0137979 A1     Apr. 25, 2024

Related U.S. Application Data

(63) Continuation of application No. PCT/KR2022/008245, filed on Jun. 10, 2022.

(30) Foreign Application Priority Data

Jun. 10, 2021 (KR) .................. 10-2021-0075414
Dec. 10, 2021 (KR) .................. 10-2021-0176285

(51) Int. Cl.
*H04W 74/0808* (2024.01)
*H04W 74/08* (2009.01)
*H04W 74/0833* (2024.01)

(52) U.S. Cl.
CPC ..... *H04W 74/0808* (2013.01); *H04W 74/085* (2013.01); *H04W 74/0866* (2013.01)

(58) Field of Classification Search
CPC .......... H04W 74/0808; H04W 74/085; H04W 74/0866
See application file for complete search history.

(56) References Cited

U.S. PATENT DOCUMENTS 11,464,050 B2 * 10/2022 Xin .................. H04W 74/0816
2022/0338253 A1 * 10/2022 Lu ..................... H04W 74/0866
(Continued)

FOREIGN PATENT DOCUMENTS

WO    WO-2018164757 A1 *  9/2018
WO       2021/010663        1/2021
(Continued)

OTHER PUBLICATIONS

International Search Report for PCT/KR2022/008245 mailed on Sep. 21, 2022 and its English translation from WIPO (now published as WO 2022/260486).

(Continued)

*Primary Examiner* — Ajay Cattungal
(74) *Attorney, Agent, or Firm* — Womble Bond Dickinson (US) LLP

(57) ABSTRACT

The present invention provides a channel switching method and device, the method performed by a multi-link device (MLD) comprising a plurality of stations, which respectively operate in a plurality of links, in a wireless communication system. Particularly, the MLD of the present invention may: receive a frame comprising channel switching information for channel switching from a first AP of a primary link from among the plurality of links; and determine whether or not channel switching is to be performed for a station connected to a second AP by means of a (Continued)

subsidiary link, on the basis of the channel switching information.

20 Claims, 20 Drawing Sheets

(56) References Cited

U.S. PATENT DOCUMENTS

| | | | | |
|---|---|---|---|---|
| 2022/0345973 | A1* | 10/2022 | Sun | H04W 74/0816 |
| 2022/0418018 | A1* | 12/2022 | Jang | H04L 9/40 |
| 2023/0007540 | A1* | 1/2023 | Nayak | H04W 28/0866 |
| 2023/0029957 | A1* | 2/2023 | Xin | H04W 74/085 |
| 2023/0054755 | A1* | 2/2023 | Patil | H04W 76/15 |
| 2023/0114284 | A1* | 4/2023 | Kim | H04W 74/0808 |
| | | | | 370/329 |
| 2023/0164831 | A1* | 5/2023 | Kim | H04W 76/15 |
| | | | | 370/329 |
| 2023/0328619 | A1* | 10/2023 | Dong | H04W 36/06 |
| 2023/0345523 | A1* | 10/2023 | Jang | H04W 76/15 |
| 2023/0354451 | A1* | 11/2023 | Jang | H04W 74/0816 |

FOREIGN PATENT DOCUMENTS

| | | |
|---|---|---|
| WO | 2021/080264 | 4/2021 |
| WO | 2021/085948 | 5/2021 |
| WO | 2021/091231 | 5/2021 |
| WO | 2022/024170 | 2/2022 |
| WO | 2022/260486 | 12/2022 |

OTHER PUBLICATIONS

Written Opinion of the International Searching Authority for PCT/KR2022/008245 mailed on Sep. 21, 2022 and its English translation by Google Translate (now published as WO 2022/260486).
Lu, Kaiying et al.: "Proposed Draft Text for MLO: Soft AP MLD Operation", doc.: 802.11-20/1407r19, Apr. 14, 2021, pp. 1-3.
Lu, Kaiying: "Resolution for Miscellaneous CIDs related to Clause 35.3.18 (CC36)", doc.: 802.11-21/1786r0, Jun. 20, 2021, pp. 1-10.
Office Action dated Oct. 21, 2024 for Japanese Patent Application No. 2023-576193 and its English translation provided by Applicant's foreign counsel.

* cited by examiner

FIG. 12

| Neighbor AP TBTT Offset | BSSID | Short SSID | BSS parameters | 20 MHz PSD | MLD Parameters | MLD AP TBTT Offset |
|---|---|---|---|---|---|---|
| 1 | 0 or 6 | 0 or 4 | 0 or 1 | 0 or 1 | 0 or 3 | 0 or 2 |

Octets:

TBTT Information field format

FIG. 13

| TBTT Information Length subfield value | TBTT Information field contents |
|---|---|
| ... | ... |
| 14 | The Neighbor AP TBTT Offset subfield, the BSS ID subfield, the Short-SSID subfield, the BSS Parameters subfield and MLD AP TBTT Offset subfield |
| 15 | The Neighbor AP TBTT Offset subfield, the BSSID subfield, the Short-SSID subfield, the BSS Parameters subfield, the 20 MHz PSD subfield and MLD AP TBTT Offset subfield |
| 17 | MLD AP TBTT Offset subfield, the BSSID subfield, the Short-SSID subfield, the BSS Parameters subfield, the 20 MHz PSD subfield and the MLD Parameters subfield |
| 18 | The Neighbor AP TBTT Offset subfield, the BSSID subfield, the Short-SSID subfield, the BSS Parameters subfield, the 20 MHz PSD subfield, the MLD Parameters subfield and MLD AP TBTT Offset subfield |
| ... | ... |

TBTT Information field contents (Table)

FIG. 14
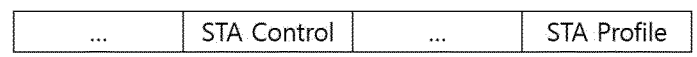
(a) Per-STA Profile subelement format
| Link ID | Complete Profile | MAC Address Present | Beacon Interval Present | DTIM Info Present | Updated Profile |
(b) STA Control field
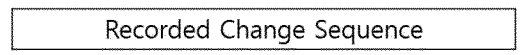
(c) Recorded Change Sequence subfield

FIG. 17

| Element ID | Length | Channel Switch Mode | New Channel Number | Channel Switch Count |
|---|---|---|---|---|
| 1 | 1 | 1 | 1 | 1 |

Octets:

Channel Switch Announcement element format

| Element ID | Length | Channel Switch Mode | New Operating Class | New Channel Number | Channel Switch Count |
|---|---|---|---|---|---|
| 1 | 1 | 1 | 1 | 1 | 1 |

Octets:

Extended Channel Switch Announcement element format

| Element ID | Element ID Extension | Switch Time |
|---|---|---|
| 1 | 1 | 3 |

Octets:

Max Channel Switch Time element format

| Element ID | Length | Quiet Count | Quiet Period | Quiet Duration | Quiet Offset |
|---|---|---|---|---|---|
| 1 | 1 | 1 | 1 | 2 | 2 |

Octets:

Quiet element format

| Element ID | Length | AP Quiet Mode | Quiet Count (optional) | Quiet Period (optional) | Quiet Duration (optional) | Quiet Offset (optional) |
|---|---|---|---|---|---|---|
| 1 | 1 | 1 | 0 or 1 | 0 or 1 | 0 or 2 | 0 or 2 |

Octets:

Quiet Channel element format

WIRELESS COMMUNICATION METHOD USING MULTI-LINK, AND WIRELESS COMMUNICATION TERMINAL USING SAME

CROSS-REFERENCE TO RELATED APPLICATIONS

This application is a continuation of International Patent Application No. PCT/KR2022/008245 filed on Jun. 10, 2022, which claims the priority to Korean Patent Application No. 10-2021-0075414 filed in the Korean Intellectual Property Office on Jun. 10, 2021, and Korean Patent Application No. 10-2021-0176285 filed in the Korean Intellectual Property Office on Dec. 10, 2021, the entire contents of which are incorporated herein by reference.

TECHNICAL FIELD

The disclosure relates to a wireless communication method using a multilink, and a wireless communication terminal using the same.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.1 In has come into the spotlight. Among them, IEEE 802.11ac supports a wide bandwidth (80 to 160 MHZ) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHZ), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHZ, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

As a wireless LAN standard after 802.11ac and 802.11ad, the IEEE 802.11ax (high efficiency WLAN, HEW) standard for providing a high-efficiency and high-performance wireless LAN communication technology in a high-density environment, in which APs and terminals are concentrated, is in the development completion stage. In an 802.11ax-based wireless LAN environment, communication with high frequency efficiency should be provided indoors/outdoors in the presence of high-density stations and access points (APs), and various technologies have been developed to implement the same.

In order to support new multimedia applications, such as high-definition video and real-time games, the development of a new wireless LAN standard has begun to increase a maximum transmission rate. In IEEE 802.11be (extremely high throughput, EHT), which is a 7th generation wireless LAN standard, development of standards is underway aiming at supporting a transmission rate of up to 30 Gbps via a wider bandwidth, an increased spatial stream, multi-AP cooperation, and the like in a 2.4/5/6 GHz band.

DISCLOSURE OF INVENTION

Technical Problem

An embodiment of the present invention is to provide a wireless communication method using a multilink, and a wireless communication terminal using the same.

In addition, an embodiment of the present invention is to provide a channel switch method of an AP and a station using multiple links.

The technical problems to be solved in the present invention are not limited to the above-mentioned technical problems, and other unmentioned technical problems can be clearly understood by those skilled in the art to which the present invention belongs from the description below.

Solution to Problem

A multi-link device (MLD) including multiple stations operating in multiple links, respectively, according to the present invention includes a processor, wherein the processor: receives a frame including channel switch information for channel switching from a first AP of a primary link among the multiple links, wherein the multiple links include the primary link and one or more non-primary links and the channel switch information is used for channel switching of a second AP for one non-primary link among the one or more non-primary links; and determines, on the basis of the channel switch information, whether to perform channel switching of a station associated with the second AP through the one non-primary link, wherein fields related to timing of the channel switching of the second AP, included in the channel switch information, are configured on the basis of the first AP.

In addition, in the present invention, the fields related to the timing of the channel switching of the second AP are configured on the basis of a target beacon transmission time (TBTT) and a beacon interval (BI) of the first AP of the primary link.

In addition, in the present invention, the fields related to the timing of the channel switching of the second AP include a switch time field indicating a time interval in which a first frame is transmitted through a switched channel from a time point at which the channel switching is started and/or a channel switch count field indicating the number of TBTTs remaining until the channel switching is started.

In addition, in the present invention, the switch time field is recognized with reference to a time point of transmission of a beacon frame having a value of the channel switch count field related to the channel switching of the second AP among beacon frames transmitted from the first AP of the primary link, the value being configured to be "1" or "0".

In addition, in the present invention, if a value of the channel switch count field is 1, the channel switching is started at a next TBTT of the first AP after transmission of the frame, and if a value of the channel switch count field is 0, the channel switching is started after transmission of the frame.

In addition, in the present invention, the channel switch information further includes a new channel number field indicating a number of a channel to be switched through the channel switching.

In addition, in the present invention, the channel switch information is included in one or more per-STA profile sub-elements included in the frame, and each of the one or more per-STA profile sub-elements includes information on another AP included in an identical MLD.

In addition, in the present invention, each of the first AP and the second AP corresponds to a non-simultaneous transmission and reception (NSTR) station not supporting simultaneous transmission and reception within an identical MLD.

In addition, in the present invention, the processor performs channel switching of the station on the basis of the channel switch information, and a frame related to completion of the channel switching is received from the first AP or the second AP.

In addition, in the present invention, the processor performs link setup again with an AP MLD including the first AP and the second AP so that the MLD is associated only in the primary link of the first AP if not performing channel switching of the station associated with the second AP through the one non-primary link on the basis of the channel switch information.

In addition, the present invention provides a method including: receiving a frame including channel switch information for channel switching from a first AP of a primary link among multiple links, wherein the multiple links include the primary link and one or more non-primary links and the channel switch information is used for channel switching of a second AP for one non-primary link among the one or more non-primary links; and determining, on the basis of the channel switch information, whether to perform channel switching of a station associated with the second AP through the one non-primary link, wherein fields related to timing of the channel switching of the second AP, included in the channel switch information, are configured on the basis of the first AP.

Advantageous Effects of Invention

An embodiment of the present invention provides a wireless communication method efficiently using multiple links and a wireless communication terminal using same.

The effects obtainable in the present invention are not limited to the above-mentioned effects, and other effects that are not mentioned may be clearly understood by those skilled in the art to which the present invention belongs, from descriptions below.

BRIEF DESCRIPTION OF DRAWINGS

FIG. 12 illustrates another example of a TBTT information field format according to an embodiment of the present invention.

FIG. 13 illustrates an example of a TBTT information length subfield indicating a TBTT information field including an MLD AP TBTT offset subfield according to an embodiment of the present invention.

FIG. 14 illustrates an example of a per-STA profile subelement format according to an embodiment of the present invention.

FIG. 17 illustrates an example of formats of elements according to an embodiment of the present invention.

BEST MODE FOR CARRYING OUT THE INVENTION

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements.

Moreover, limitations such as "or more" or "or less" based on a specific threshold may be appropriately substituted with "more than" or "less than", respectively.

Hereinafter, in the present invention, a field and a subfield may be interchangeably used.

Figure 1:
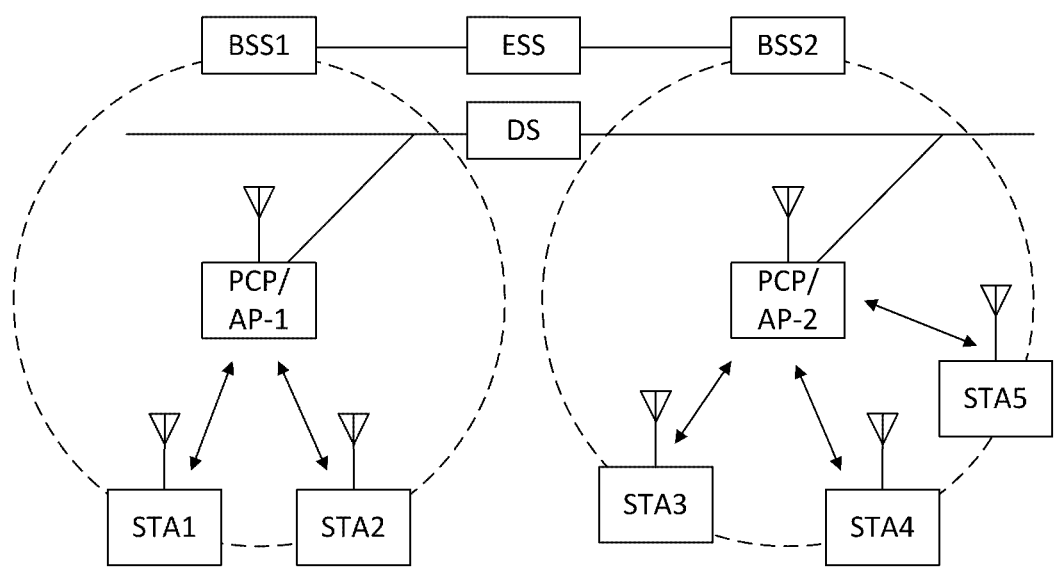
FIG. 1 illustrates a wireless LAN system according to an embodiment of the present invention.

FIG. 1 illustrates a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points AP-1 and AP-2 which are stations providing a distribution service, and a distribution system (DS) connecting the multiple access points AP-1 and AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a communication unit and according to the embodiment, may further include a user interface unit and a display unit. The processor may generate a frame to be transmitted through a wireless network or process a frame received through the wireless network and besides, perform various processing for controlling the station. In addition, the communication unit is functionally connected with the processor and transmits and receives frames through the wireless network for the station. According to the present invention, a terminal may be used as a term which includes user equipment (UE).

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense. In the present invention, an AP may also be referred to as a base wireless communication terminal. The base wireless communication terminal may be used as a term which includes an AP, a base station, an cNB (i.e. cNodeB) and a transmission point (TP) in a broad sense. In addition, the base wireless communication terminal may include various types of wireless communication terminals that allocate medium resources and perform scheduling in communication with a plurality of wireless communication terminals.

A plurality of infrastructure BSSs may be connected with each other through the distribution system (DS). In this case, a plurality of BSSs connected through the distribution system is referred to as an extended service set (ESS).

Figure 2:
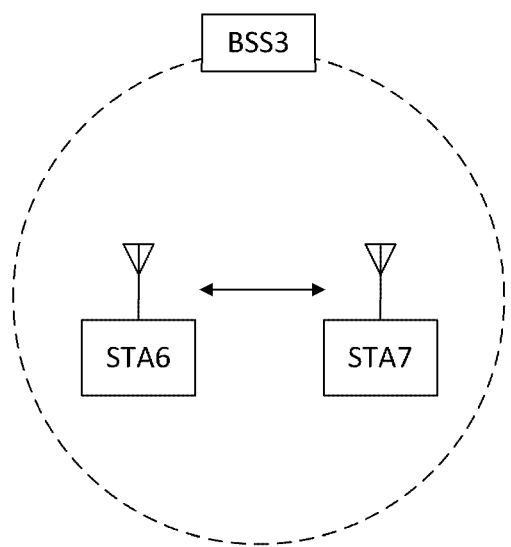
FIG. 2 illustrates a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
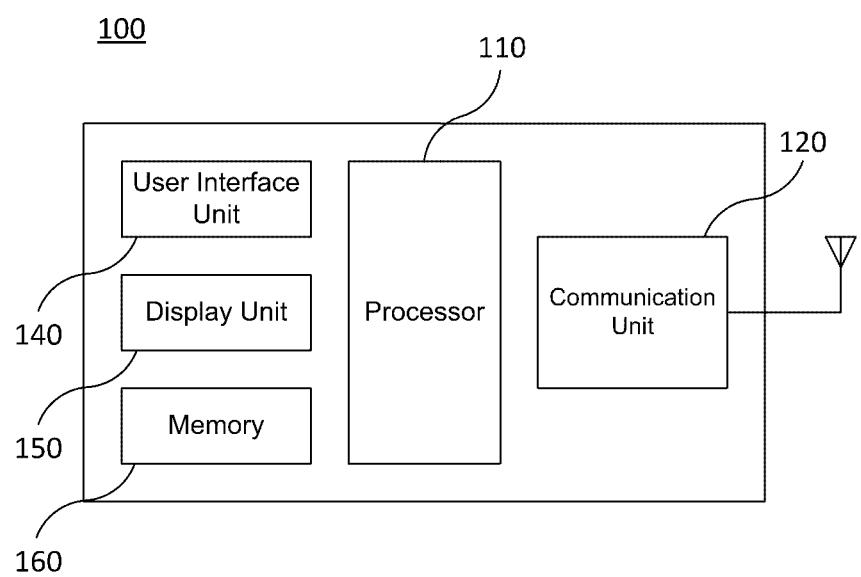
FIG. 3 illustrates a configuration of a station according to an embodiment of the present invention.

FIG. 3 is a block diagram illustrating a configuration of a station 100 according to an embodiment of the present invention. As illustrated in FIG. 3, the station 100 according to the embodiment of the present invention may include a processor 110, a communication unit 120, a user interface unit 140, a display unit 150, and a memory 160.

First, the communication unit 120 transmits and receives a wireless signal such as a wireless LAN packet, or the like and may be embedded in the station 100 or provided as an exterior. According to the embodiment, the communication unit 120 may include at least one communication module using different frequency bands. For example, the communication unit 120 may include communication modules having different frequency bands such as 2.4 GHz, 5 GHZ, 6 GHZ and 60 GHz. According to an embodiment, the station 100 may include a communication module using a frequency band of 7.125 GHz or more and a communication module using a frequency band of 7.125 GHz or less. The respective communication modules may perform wireless communication with the AP or an external station according to a wireless LAN standard of a frequency band supported by the corresponding communication module. The communication unit 120 may operate only one communication module at a time or simultaneously operate multiple communication modules together according to the performance and requirements of the station 100. When the station 100 includes a plurality of communication modules, each communication module may be implemented by independent elements or a plurality of modules may be integrated into one chip. In an embodiment of the present invention, the communication unit 120 may represent a radio frequency (RF) communication module for processing an RF signal.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the communication unit 120, and the like. That is, the processor 110 may be a modem or a modulator/demodulator for modulating and demodulating wireless signals transmitted to and received from the communication unit 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the communication unit 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
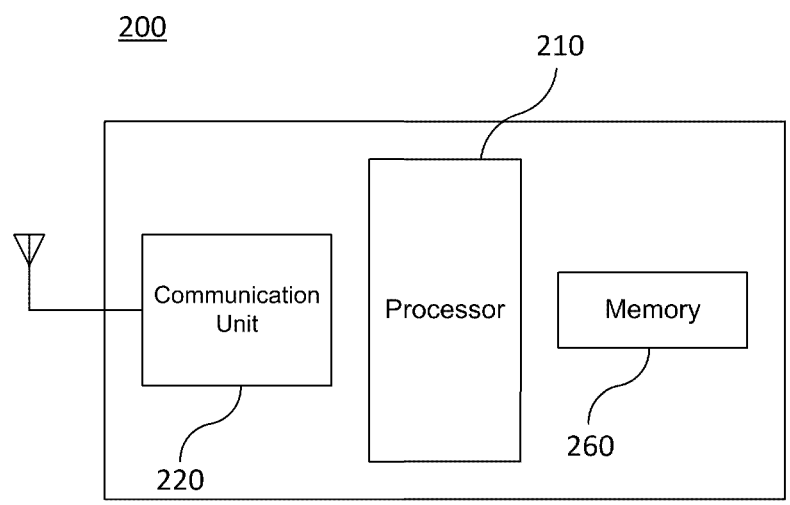
FIG. 4 illustrates a configuration of an access point according to an embodiment of the present invention.

FIG. 4 is a block diagram illustrating a configuration of an AP 200 according to an embodiment of the present invention. As illustrated in FIG. 4, the AP 200 according to the embodiment of the present invention may include a processor 210, a communication unit 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the communication unit 220 for operating the BSS in at least one frequency band. As described in the embodiment of FIG. 3, the communication unit 220 of the AP 200 may also include a plurality of communication modules using different frequency bands. That is, the AP 200 according to the embodiment of the present invention may include two or more communication modules among different frequency bands, for example, 2.4 GHz, 5 GHZ, 6 GHZ and 60 GHz together. Preferably, the AP 200 may include a communication module using a frequency band of 7.125 GHz or more and a communication module using a frequency band of 7.125 GHz or less. The respective communication modules may perform wireless communication with the station according to a wireless LAN standard of a frequency band supported by the corresponding communication module. The communication unit 220 may operate only one communication module at a time or simultaneously operate multiple communication modules together according to the performance and requirements of the AP 200. In an embodiment of the present invention, the communication unit 220 may represent a radio frequency (RF) communication module for processing an RF signal.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. According to an embodiment, the processor 210 may be a modem or a modulator/demodulator for modulating and demodulating wireless signals transmitted to and received from the communication unit 220. The processor 210 controls various operations such as wireless signal transmission/reception of the AP 200 according to the embodiment of the present invention. A detailed embodiment thereof will be described below.

Figure 5:
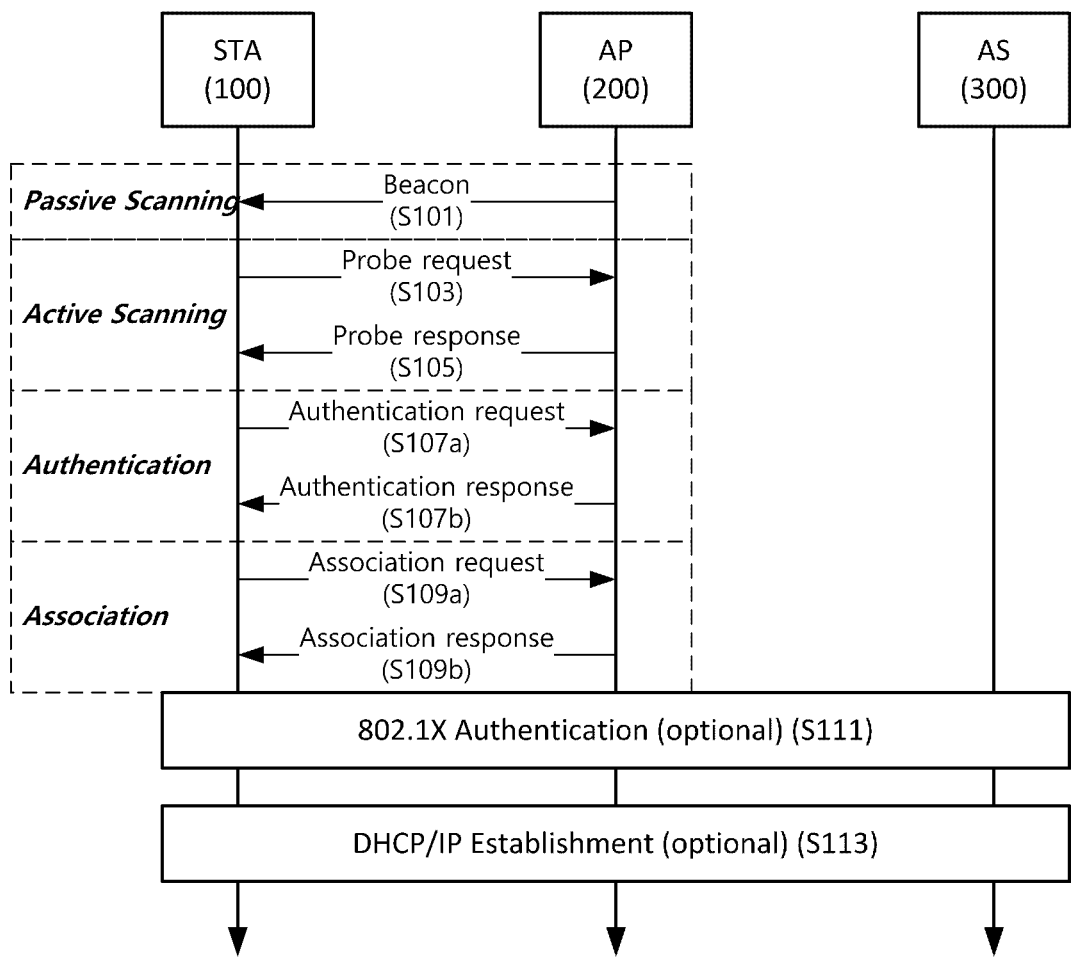
FIG. 5 schematically illustrates a process in which a STA and an AP set a link.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b). In this specification, an association basically means a wireless association, but the present invention is not limited thereto, and the association may include both the wireless association and a wired association in a broad sense.

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Figure 6:
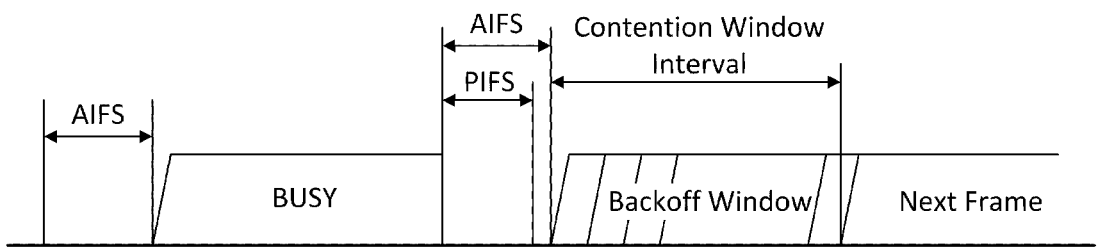
FIG. 6 illustrates a carrier sense multiple access (CSMA)/collision avoidance (CA) method used in wireless LAN communication.

FIG. 6 is a diagram illustrating a carrier sense multiple access (CSMA)/collision avoidance (CA) method used in wireless LAN communication.

A terminal that performs a wireless LAN communication checks whether a channel is busy by performing carrier sensing before transmitting data. When a wireless signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a wireless signal having the CCA threshold or more, which is received by the terminal, indicates the corresponding terminal as a receiver, the terminal processes the received wireless signal. Meanwhile, when a wireless signal is not sensed in the corresponding channel or a wireless signal having a strength smaller than the CCA threshold is sensed, it is determined that the channel is idle.

When it is determined that the channel is idle, each terminal having data to be transmitted performs a backoff procedure after an inter frame space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number determined by the corresponding terminal during an interval of an idle state of the channel and a terminal that completely exhausts the slot time(s) attempts to access the corresponding channel. As such, an interval in which each terminal performs the backoff procedure is referred to as a contention window interval. In this case, the random number may be referred to as a backoff counter. That is, an initial value of the backoff counter is configured by an integer corresponding to a random number acquired by the terminal. When the terminal detects that the channel is idle during a slot time, the terminal may reduce the backoff counter by 1. In addition, when the backoff counter reaches 0, the terminal may be allowed to perform channel access in the corresponding channel. Accordingly, when the channel is idle for a slot time of the backoff counter or an AIFS time, transmission of the terminal may be allowed.

When a specific terminal successfully accesses the channel, the corresponding terminal may transmit data through the channel. However, when the terminal which attempts the access collides with another terminal, the terminals which collide with each other are assigned with new random numbers, respectively to perform the backoff procedure again. According to an embodiment, a random number newly assigned to each terminal may be decided within a range (2*CW) which is twice larger than a range (a contention window, CW) of a random number which the corresponding terminal is previously assigned. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

Examples of Various PPDU Formats

Figure 7:
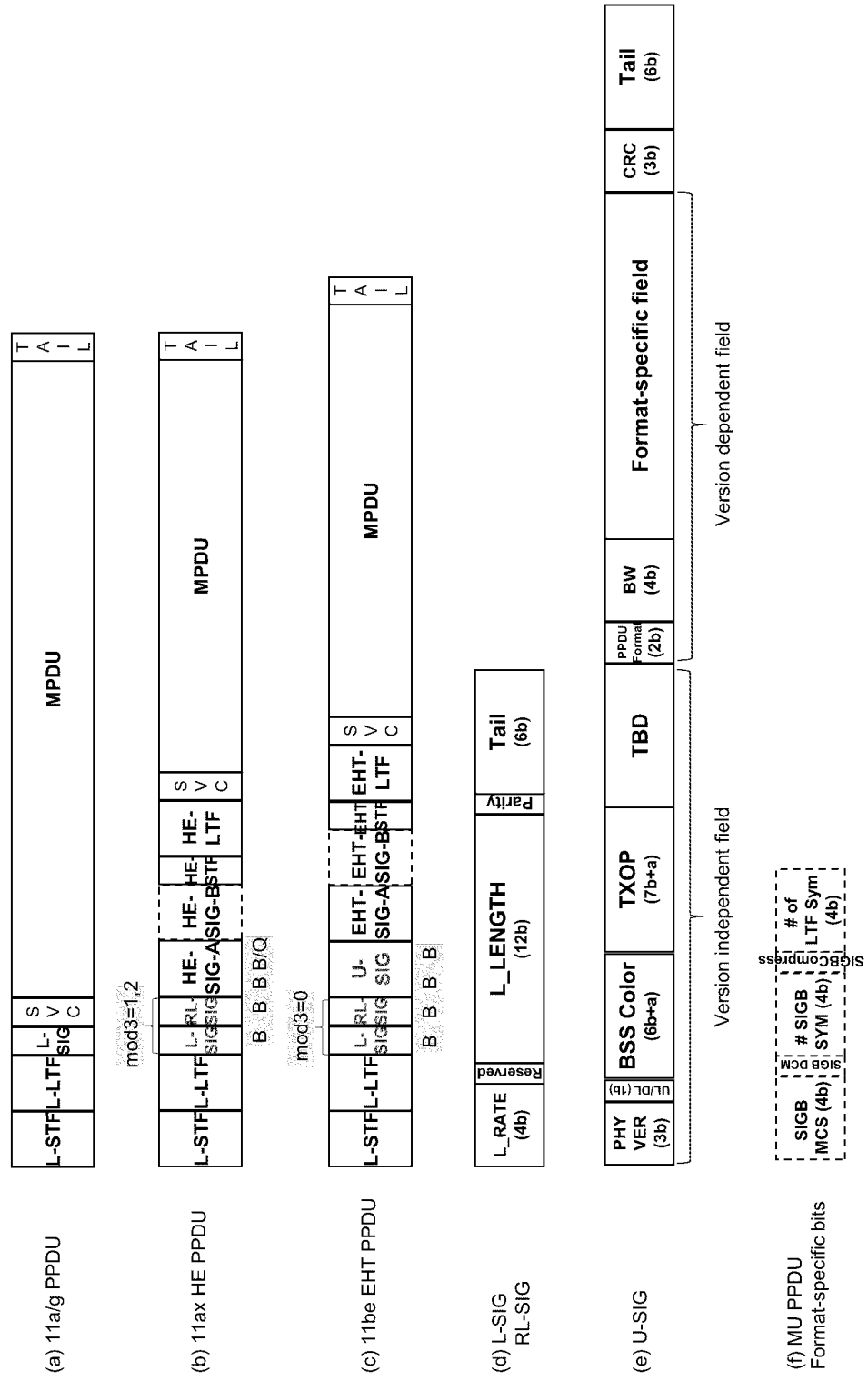
FIG. 7 illustrates an example of a format of a PLCP Protocol data unit (PPDU) for each of various standard generations.

FIG. 7 illustrates an example of a format of a PLCP Protocol data unit (PPDU) for each of various standard generations. More specifically, FIG. 7(*a*) illustrates an embodiment of a legacy PPDU format based on 802.11a/g, FIG. 7(*b*) illustrates an embodiment of an HE PPDU format based on 802.11ax, and FIG. 7(*c*) illustrates an embodiment of a non-legacy PPDU (i.e., EHT PPDU) format based on 802.11be. FIG. 7(*d*) illustrates detailed field configurations of RL-SIG and L-SIG commonly used in the PPDU formats.

Referring to FIG. 7(*a*), a preamble of the legacy PPDU includes a legacy short training field (L-STF), a legacy long training field (L-LTF), and a legacy signal field (L-SIG). In an embodiment of the present invention, the L-STF, the L-LTF, and the L-SIG may be referred to as a legacy preamble.

Referring to FIG. 7(*b*), a preamble of the HE PPDU additionally includes, in the legacy preamble, a repeated legacy short training field (RL-SIG), a high efficiency signal A field (HE-SIG-A), a high efficiency signal B field (HE-SIG-B), a high efficiency short training field (HE-STF), and a high efficiency long training field (HE-LTF). In an embodiment of the present invention, the RL-SIG, HE-SIG-A, the HE-SIG-B, the HE-STF and the HE-LTF may be referred to as an HE preamble. A specific configuration of the HE preamble may be modified according to an HE PPDU format. For example, HE-SIG-B may be used only in an HE MU PPDU format.

Referring to FIG. 7(*c*), a preamble of the EHT PPDU additionally includes, in the legacy preamble, a repeated legacy short training field (RL-SIG), a universal signal field (U-SIG), and an extremely high throughput signal A field (EHT-SIG-A), an extremely high throughput signal B field (EHT-SIG-B), an extremely high throughput short training field (EHT-STF), and an extremely high throughput long training field (EHT-LTF). In an embodiment of the present invention, the RL-SIG, EHT-SIG-A, the EHT-SIG-B, the EHT-STF and the EHT-LTF may be referred to as an EHT preamble. A specific configuration of a non-legacy preamble may be modified according to an EHT PPDU format. For example, EHT-SIG-A and EHT-SIG-B may be used only in a part of the EHT PPDU format.

64-FFT OFDM is applied in an L-SIG field included in the preamble of the PPDU, and the L-SIG field includes a total of 64 subcarriers. Among 64 subcarriers, 48 subcarriers excluding a guard subcarrier, a DC subcarrier, and a pilot subcarrier are used for transmission of L-SIG data. BPSK and a modulation and coding scheme (MCS) of rate=1/2 are applied in L-SIG, and therefore the L-SIG may include a total of 24 bits of information. FIG. 7(d) illustrates a 24-bit information configuration of L-SIG.

Referring to FIG. 7(d), the L-SIG includes an L_RATE field and an L_LENGTH field. The L_RATE field includes 4 bits and indicates an MCS used for data transmission. Specifically, the L_RATE field indicates one value among transmission rates of 6/9/12/18/24/36/48/54 Mbps obtained by combining a modulation scheme of BPSK/QPSK/16-QAM/64-QAM, etc. and an inefficiency of 1/2, 2/3, 3/4, etc. A total length of a corresponding PPDU may be indicated by combining information of the L_RATE field and information of the L_LENGTH field. In a non-legacy PPDU format, the L_RATE field is configured to a minimum rate of 6 Mbps.

A unit of the L_LENGTH field is a byte and a total of 12 bits are allocated to signal up to 4095, and a length of the PPDU may be indicated in combination with the L_RATE field. A legacy terminal and a non-legacy terminal may interpret the L_LENGTH field in different ways.

Firstly, a method of interpreting the length of the PPDU by the legacy terminal and the non-legacy terminal by using the L_LENGTH field is described below. When a value of the L_RATE field is configured to indicate 6 Mbps, 3 bytes during 4 us which is one symbol duration of 64 FET (i.e., 24 bits) may be transmitted. Therefore, the 64 FET standard symbol number after an L-SIG is acquired by adding 3 bytes corresponding to a SVC field and a Tail field to the L_LENGTH field value and then dividing the same by 3 bytes which is a transmission amount of one symbol. When multiplying the acquired symbol number by 4 us which is one symbol duration and then adding 20 us which is consumed to transmit the L-STF, the L-LTF, and the L-SIG, the length of a corresponding PPDU, i.e., a receipt time (RXTIME) is acquired, which is expressed by Equation 1 below.

$$RXTIME(\text{us}) = \left(\left\lceil \frac{\text{L\_LENGTH} + 3}{3} \right\rceil\right) \times 4 + 20 \quad \text{[Equation 1]}$$

In this case, $\lceil x \rceil$ denotes the smallest natural number greater than or equal to x. Since the maximum value of the L_LENGTH field is 4095, the length of the PPDU can be set up to 5.464 ms. The non-legacy terminal transmitting the PPDU should set the L_LENGTH field as shown in Equation 2 below.

$$\text{L\_LENGTH(byte)} = \left(\left\lceil \frac{TXTIME - 20}{4} \right\rceil\right) \times 3 - 3 \quad \text{[Equation 2]}$$

Herein, TXTIME is the total transmission time constituting the corresponding PPDU, and is expressed by Equation 3 below. In this case, TX represents the transmission time of X.

$$\text{TXTIME (us)} = T_{L\text{-}STF} + T_{L\text{-}LTF} + T_{L\text{-}SIG} + T_{RL\text{-}SIG} + T_{U\text{-}SIG} + (T_{EHT\text{-}SIG\text{-}A}) + (T_{EHT\text{-}SIG\text{-}B}) + T_{EHT\text{-}STF} + N_{EHT\text{-}LTF} \cdot T_{EHT\text{-}LTF} + T_{DATA} \quad \text{[Equation 3]}$$

Referring to the above equations, the length of the PPDU is calculated based on a rounded up value of L_LENGTH/3. Therefore, for a random value of k, three different values of L_LENGTH={3k+1, 3k+2, 3(k+1)} indicate the same PPDU length.

Referring to FIG. 7(e), a universal SIG (U-SIG) field continues to exist in an EHT PPDU and a WLAN PPDU of a subsequent generation, and serves to classify a generation of a PPDU, which includes 11be. U-SIG is a 64 FFT-based OFDM 2 symbol and may transfer a total of 52 bits of information. In 52 bits, 43 bits excluding 9 bits for CRC/Tail are largely divided into a version independent (VI) field and a version dependent (VD) field.

A VI bit enables a current bit configuration to be maintained even later on, so that even if a PPDU of a subsequent generation is defined, current 11be terminals may obtain information on the PPDU via the VI fields of the PPDU. To this end, the VI field includes PHY version, UL/DL, BSS color, TXOP, and reserved fields. The PHY version field is 3 bits, and serves to sequentially classify 11be and subsequent generation wireless LAN standards into versions. 11be has a value of 000b. The UL/DL field identifies whether the PPDU is an uplink/downlink PPDU. BSS color indicates an identifier for each BSS defined in 11ax, and has a value of 6 bits or more.

TXOP indicates transmit opportunity duration transmitted in a MAC header, wherein, by adding the TXOP to a PHY header, the PPDU may infer a length of the TXOP included therein without having to decode an MPDU, and the TXOP has a value of 7 bits or more.

The VD field is signaling information useful only for an 11be version of the PPDU, and may include a field commonly used in any PPDU format, such as PPDU format and BW, and a field defined differently for each PPDU format. The PPDU format is a classifier that classifies EHT single user (SU), EHT multiple user (MU), EHT trigger-based (TB), EHT extended range (ER) PPDU, etc. The BW field signals five basic PPDU BW options (BW, which is expressible in the form of an exponential power of 202, may be referred to as basic BW) of 20, 40, 80, 160 (80+80), and 320 (160+160) MHz and various remaining PPDU BWs configured via preamble puncturing. After being signaled at 320 MHz, signaling may be performed in a form in which some 80 MHz is punctured. A punctured and modified channel type may be signaled directly in the BW field, or may be signaled using the BW field with a field (e.g., a field within the EHT-SIG field) appearing after the BW field. If the BW field is configured to 3 bits, a total of 8 BW signaling may be performed, and therefore only up to 3 signaling may be performed in a puncturing mode. If the BW field is configured to 4 bits, a total of 16 BW signaling may be performed, and therefore up to 11 signaling may be performed in the puncturing mode.

A field located after the BW field varies depending on the type and format of the PPDU, an MU PPDU and an SU PPDU may be signaled in the same PPDU format, a field for classification between the MU PPDU and the SU PPDU may be located before an EHT-SIG field, and additional signaling may be performed for the same. Both the SU PPDU and the MU PPDU include the EHT-SIG field, but some fields that are not required in the SU PPDU may be compressed. Information on the field to which the compression has been applied may be omitted or may have a size smaller than a size of an original field included in the MU PPDU. For example, in a case of the SU PPDU, a common field of the EHT-SIG may be omitted or replaced, or the SU PPDU may have a different configuration in which a user specific field is replaced, reduced to one, or the like.

Alternatively, the SU PPDU may further include a compression field indicating whether compression is performed, and a part of field (e.g., RA fields, etc.) may be omitted according to a value of the compressed field.

If a part of the EHT-SIG field of the SU PPDU is compressed, information to be included in the compressed field may be signaled also in an uncompressed field (e.g., the common field, etc.). The MU PPDU corresponds to a PPDU format for concurrent reception by multiple users, and therefore the EHT-SIG field is required to be transmitted subsequently to the U-SIG field, and the amount of signaled information may vary. That is, a plurality of MU PPDUs are transmitted to a plurality of STAs, so that the respective STAs should recognize locations of RUs, at which the MU PPDUs are transmitted, the STAs to which the RUs have been allocated respectively, and whether the transmitted MU PPDUs have been transmitted to the STAs themselves. Therefore, an AP should transmit information described above, by including the same in the EHT-SIG field. To this end, information for efficient transmission of the EHT-SIG field is signaled in the U-SIG field, and this may correspond to an MCS that is a modulation method and/or the number of symbols in the EHT-SIG field. The EHT-SIG field may include information on a size and location of an RU allocated to each user.

In the case of the SU PPDU, a plurality of RUs may be allocated to an STA, and the plurality of RUs may be continuous or discontinuous. If the RUs allocated to the STA are discontinuous, the STA should recognize a punctured RU in the middle in order to efficiently receive the SU PPDU. Accordingly, the AP may transmit the SU PPDU including information (e.g., a puncturing pattern of the RUs, etc.) of punctured RUs among the RUs allocated to the STA. That is, in the case of the SU PPDU, a puncturing mode field, which includes information indicating, in a bitmap format, etc., a puncturing pattern and whether the puncturing mode is applied, may be included in the EHT-SIG field, and the puncturing mode field may signal a discontinuous channel type appearing within a bandwidth.

The signaled discontinuous channel type is limited, and indicates discontinuous channel information and BW of the SU PPDU in combination with a value of the BW field. For example, the SU PPDU is a PPDU transmitted only to a single terminal, so that the STA may recognize a bandwidth allocated to itself via the BW field included in the PPDU, and the SU PPDU may recognize a punctured resource in the allocated bandwidth via the puncturing mode field of the EHT-SIG field or the U-SIG field included in the PPDU. In this case, the terminal may receive the PPDU in resource units remaining after excluding a specific channel of the punctured resource unit. The plurality of RUs allocated to the STA may be configured by different frequency bands or tones.

Only a limited discontinuous channel type is signaled in order to reduce signaling overhead of the SU PPDU. Puncturing may be performed for each 20 MHZ sub-channel, so that if puncturing is performed for BW having a large number of 20 MHz sub-channels, such as 80, 160, and 320 MHz, a discontinuous channel (if puncturing of only edge 20 MHz is considered to be discontinuous) type should be signaled in the case of 320 MHz by expressing whether each of 15 20 MHz sub-channels remaining after excluding a primary channel is used. As such, allocating 15 bits to signal a discontinuous channel type of single user transmission may act as excessively large signaling overhead in consideration of a low transmission rate of a signaling part.

The present disclosure suggests a signaling technique of a discontinuous channel type of the SU PPDU and illustrates the discontinuous channel type determined according to the suggested technique. In addition, the present disclosure suggests a signaling technique of a puncturing type of each of a primary 160 MHz and a secondary 160 MHz in 320 MHz BW configuration of the SU PPDU.

In addition, an embodiment of the present disclosure suggests a technique which differs in the configuration of the PPDU indicating the preamble puncturing BW values according to the PPDU format signaled in the PPDU format field. If the length of the BW field is 4 bits, in case of the EHT SU PPDU or the TB PPDU, the EHT-SIG-A of 1 symbol may be additionally signaled after the U-SIG, or the EHT-SIG-A may be never signaled, so that by considering this, it is necessary to completely signal a maximum of 11 puncturing modes through only the BW field of the U-SIG. However, in case of the EHT MU PPDU, since the EHT-SIG-B is additionally signaled after the U-SIG, the maximum of 11 puncturing modes may be signaled by a method different from the SU PPDU. In case of the EHT ER PPDU, the BW field is configured as 1 bit to signal information on whether the PPDU uses 20 MHz or 10 MHz band.

FIG. 7(f) illustrates a configuration of a format-specific field of a VD field when the EHT MU PPDU is indicated in the PPDU format field of U-SIG. In the case of the MU PPDU, SIG-B, which is a signaling field for concurrent reception by multiple users, is essentially required, and SIG-B may be transmitted without separate SIG-A after U-SIG. To this end, information for decoding of SIG-B should be signaled in U-SIG. These fields include SIG-B MCS, SIG-B DCM, Number of SIG-B Symbols, SIG-B Compression, and Number of EHT-LTF Symbols.

Figure 8:
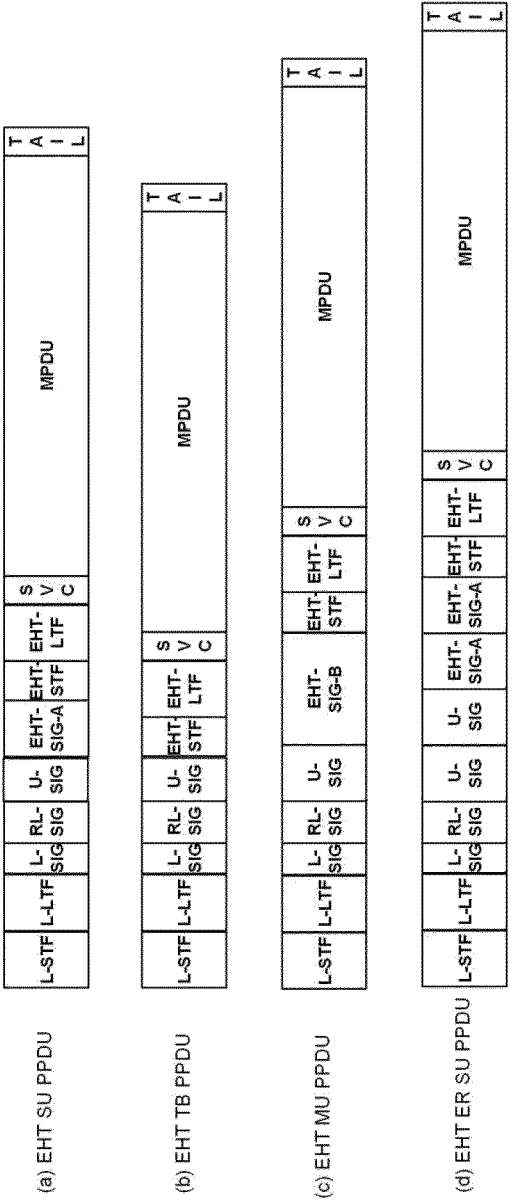
FIG. 8 illustrates an example of various extremely high throughput (EHT) physical protocol data unit (PPDU) formats and a method for indicating the same according to an embodiment of the present invention.

FIG. 8 illustrates an example of various extremely high throughput (EHT) physical protocol data unit (PPDU) formats and a method for indicating the same according to an embodiment of the present invention.

Referring to FIG. 8, a PPDU may include a preamble and a data part, and an EHT PPDU format, that is a PPDU type, may be classified according to a U-SIG field included in the preamble. Specifically, based on a PPDU format field included in the U-SIG field, whether the format of the PPDU is an EHT PPDU may be indicated.

FIG. 8(a) shows an example of an EHT SU PPDU format for a single STA. An EHT SU PPDU is a PPDU used for single user (SU) transmission between an AP and a single STA, and an EHT-SIG-A field for additional signaling may be located after the U-SIG field.

FIG. 8(b) shows an example of an EHT trigger-based PPDU format which corresponds to an EHT PPDU transmitted based on a trigger frame. An EHT Trigger-based PPDU is an EHT PPDU transmitted based on a trigger frame and is an uplink PPDU used for a response to the trigger frame. Unlike in the EHT SU PPDU, an EHT-SIG-A field is not located after a U-SIG field in the EHT PPDU.

FIG. 8(c) shows an example of an EHT MU PPDU format which corresponds to an EHT PPDU for multiple users. An EHT MU PPDU is a PPDU used to transmit the PPDU to one or more STAs. In the EHT MU PPDU format, an HE-SIG-B field may be located after a U-SIG field.

FIG. 8(d) shows an example of an EHT ER SU PPDU format used for single user transmission with an STA in an extended range. An EHT ER SU PPDU may be used for single user transmission with an STA of a wider range compared to the EHT SU PPDU described in FIG. 8(a), and a U-SIG field may be repeatedly located on a time axis.

The EHT MU PPDU described in FIG. 8(c) may be used by an AP to perform downlink transmission to a plurality of STAs. Here, the EHT MU PPDU may include scheduling information so that the plurality of STAs may concurrently receive the PPDU transmitted from the AP. The EHT MU PPDU may transfer, to the STAs, AID information of a transmitter and/or a receiver of the PPDU transmitted via a user specific field of EHT-SIG-B. Accordingly, the plurality of terminals having received the EHT MU PPDU may perform a spatial reuse operation based on the AID information of the user specific field included in a preamble of the received PPDU.

Specifically, a resource unit allocation (RA) field of the HE-SIG-B field included in the HE MU PPDU may include information on a configuration of a resource unit (e.g., a division form of the resource unit) in a specific bandwidth (e.g., 20 MHz, etc.) of a frequency axis. That is, the RA field may indicate configurations of resource units segmented in a bandwidth for transmission of the HE MU PPDU, in order for the STA to receive the PPDU. Information on the STA allocated (or designated) to each segmented resource unit may be included in the user specific field of EHT-SIG-B so as to be transmitted to the STA. That is, the user specific field may include one or more user fields corresponding to the respective segmented resource units.

For example, a user field corresponding to at least one resource unit used for data transmission among the plurality of segmented resource units may include an AID of a receiver or a transmitter, and a user field corresponding to the remaining resource unit(s) which is not used for data transmission may include a preconfigured null STA ID.

For convenience of description, a frame or a MAC frame may be interchangeably used with an MPDU in the disclosure.

When one wireless communication device communicates by using multiple links, the communication efficiency of the wireless communication device may be increased. In this case, the link, as a physical path, may be configured as one wireless medium that can be used to deliver a MAC service data unit (MSDU). For example, in a case where a frequency band of one of the links is in use by another wireless communication device, the wireless communication device may continue to perform communication through another link. As such, the wireless communication device may usefully use multiple channels. In addition, when the wireless communication device simultaneously performs communication using multiple links, the overall throughput may be increased. However, in the existing wireless LAN, it has been stipulated that one wireless communication device uses one link.

Therefore, a wireless LAN operation method for using multiple links is required. A wireless communication method of a wireless communication device using multiple links will be described through FIGS. 9 to 26. First, a specific form of a wireless communication device using multiple links will be described through FIG. 9.

Figure 9:
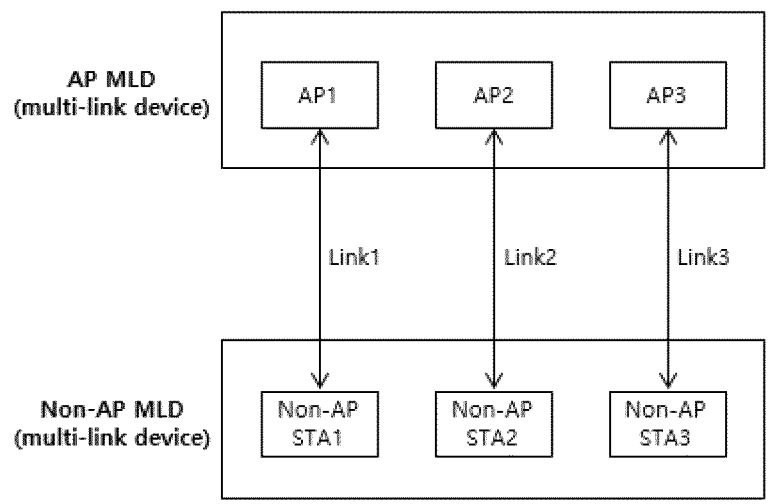
FIG. 9 illustrates a multi-link device according to an embodiment of the present invention.

FIG. 9 illustrates a multi-link device according to an embodiment of the present invention.

A multi-link device (MLD) may be defined for a wireless communication method using the multiple links described above. The multi-link device may represent a device having one or more affiliated stations. According to a specific embodiment, the multi-link device may represent a device having two or more affiliated stations. In addition, the multi-link device may exchange multi-link affiliated stations. The multi-link element includes information on one or more stations or one or more links. The multi-link element may include a multi-link setup element, which will be described below. In this case, the multi-link device may be a logical entity. Specifically, the multi-link device may have multiple affiliated stations.

The multi-link device may be referred to as a multi-link logical entity (MLLE) or a multi-link entity (MLE). The multi-link device may have one medium access control (MAC) service access point (SAP) up to logical link control (LLC). In addition, the MLD may also have one MAC data service.

The multiple stations included in the multi-link device may operate in multiple links. In addition, the multiple stations included in the multi-link device may operate on multiple channels. Specifically, the multiple stations included in the multi-link device may operate in multiple different links or on multiple different channels. For example, the multiple stations included in the multi-link device may operate on multiple different channels of 2.4 GHZ, 5 GHZ, and 6 GHZ.

The operation of the multi-link device may be referred to as a multi-link operation, an MLD operation, or a multi-band operation. In addition, when a station affiliated with the multi-link device is an AP, the multi-link device may be referred to as the AP MLD. In addition, when a station affiliated with the multi-link device is a non-AP station, the multi-link device may be referred to as a non-AP MLD.

FIG. 9 illustrates an operation in which a non-AP MLD and an AP-MLD communicate with each other. Specifically, the non-AP MLD and the AP-MLD perform communication by using three links, respectively. The AP MLD includes a first AP (AP 1), a second AP (AP 2), and a third AP (AP 3). The non-AP MLD includes a first non-AP STA (non-AP STA 1), a second non-AP STA (non-AP STA 2), and a third non-AP STA (non-AP STA 3). The first AP (AP 1) and the first non-AP STA (non-AP STA 1) communicate through a first link (Link 1). In addition, the second AP (AP 2) and the second non-AP STA (non-AP STA 2) communicate through a second link (Link 2). In addition, the third AP (AP 3) and the third non-AP STA (non-AP STA 3) communicate through a third link (Link 3).

The multi-link operation may include a multi-link setup operation. The multi-link setup may correspond to an association operation of the single link operation described above and may need to be performed first for frame exchange in the multiple links. The multi-link device may obtain information necessary for the multi-link setup from a multi-link setup element. Specifically, the multi-link setup element may include capability information associated with the multiple links. In this case, the capability information may include information indicating whether any one of multiple of devices included in the multi-link device performs transmission and simultaneously, another device may perform reception. In addition, the capability information may include information on the links available for each station included in the MLD. In addition, the capability information may include information on the channels available for each station included in the MLD.

The multi-link setup may be set up through agreement between peer stations. Specifically, the multi-link setup may be performed through communication between stations without communication with the AP. In addition, the multi-link setup may be set up through any one link. For example, even if the first link to the third link are set up through the multi-link, the multi-link setup may be performed through the first link.

In addition, a mapping between a traffic identifier (TID) and a link may be set up. Specifically, frames corresponding to a TID of a particular value may only be exchanged through a pre-specified link. The mapping between the TID and the link may be performed as a directional-based setup. For example, when multiple links are set up between a first multi-link device and a second multi-link device, the first multi-link device may be set up to transmit a frame of the first TID to the multiple first links, and the second multi-link device may be set up to transmit a frame of the second TID to the first link. In addition, there may be a default setup for the mapping between the TID and the link. Specifically, when there is no additional setup in the multi-link setup, the multi-link device may exchange frames corresponding to the TID at each link according to the default setup. In this case, the default setup may be that all the TIDs are exchanged in any one link.

A TID will be described in detail. The TID is an ID for classifying traffic and data in order to support quality of service (QOS). In addition, the TID may be used or allocated in a higher layer than a MAC layer. In addition, the TID may indicate a traffic category (TC) or a traffic stream (TS). In addition, the TID may be classified as 16 types. For example, the TID may be designated as one of the values in the range from 0 to 15. A TID value to be used may be differently designated according to an access policy and a channel access or medium access method. For example, in a case that enhanced distributed channel access (EDCA) or hybrid coordination function contention-based channel access (HCAF) is used, the TID may be allocated with a value in the range of 0 to 7. In a case where the EDCA is used, the TID may indicate a user priority (UP). In this case, the UP may be designated according to a TC or a TS. The UP may be allocated in a higher layer than MAC. In addition, in a case where HCF controlled channel access (HCCA) or SPCA is used, the TID may be allocated with a value in the range of 8 to 15. In a case where the HCCA or SPCA is used, the TID may indicate a TSID. In addition, in a case where the HEMM or the SEMM is used, the TID may be allocated with a value in the range of 8 to 15. In a case where the HEMM or SEMM is used, the TID may indicate a TSID.

A UP and an AC may be mapped. The AC may be a label for providing a QoS in EDCA. The AC may be a label for indicating an EDCA parameter set. An EDCA parameter or an EDCA parameter set may be a parameter used for EDCA channel contention. A QoS station may guarantee a QoS using the AC. In addition, the AC may include AC_BK, AC_BE, AC_VI, and AC_VO. The AC_BK, AC_BE, AC_VI, and AC_VO may indicate a background, a best effort, a video, and a voice, respectively. In addition, each of the AC_BK, AC_BE, AC_VI, and AC_VO may be classified into subordinate ACs. For example, the AC_VI may be subdivided into AC_VI primary and AC_VI alternate. In addition, the AC_VO may be subdivided into AC_VO primary and AC_VO alternate. In addition, a UP or a TID may be mapped to an AC. For example, a UP or TID having a value of 1, 2, 0, 3, 4, 5, 6, and 7 may be mapped to AC_BK, AC_BK, AC_BE, AC_BE, AC_VI, AC_VI, AC_VO, and AC_VO, respectively. In addition, a UP or TID having a value of 1, 2, 0, 3, 4, 5, 6, and 7 may be mapped to AC_BK, AC_BK, AC_BE, AC_BE, AC_VI alternate, AC_VI primary, AC_VO primary, and AC_VO alternate, respectively. In addition, a UP or TID having a value of 1, 2, 0, 3, 4, 5, 6, and 7 may sequentially have higher priorities. That is, 1 denotes a low priority and 7 denotes a high priority. Therefore, AC_BK, AC_BE, AC_VI, and AC_VO may sequentially have higher priorities. In addition, AC_BK, AC_BE, AC_VI, and AC_VO may correspond to an AC index (ACI) 0, 1, 2, and 3, respectively. Due to such characteristics of a TID, a mapping between a TID and a link may indicate a mapping between an AC and a link. In addition, a mapping between a link and an AC may indicate a mapping between a TID and a link.

As described above, a TID may be mapped to each of multiple links. The mapping may be designating a link in which traffic corresponding to a predetermined TID or AC can be exchanged. In addition, a TID or AC that is transmittable for each transmission direction in a link may be designated. As described above, there may be a default setup for a mapping between a TID and a link. Specifically, in a case where there is no additional setup for a multi-link setup, a multi-link device may exchange a frame corresponding to a TID in each link according to the default setup. In this case, the default setup may be exchanging all TIDs in any one link. Any TID or AC at any time point may be always mapped to at least any one link. A management frame and a control frame may be transmitted in all links.

In a case where a link is mapped to a TID or an AC, only a data frame corresponding to the TID or AC mapped to the corresponding link may be transmitted in the corresponding link. Therefore, in a case where a link is mapped to a TID or an AC, a frame that does not correspond to the TID or AC mapped to the corresponding link may not be transmitted in the corresponding link. In a case where a link is mapped to a TID or an AC, an ACK may also be transmitted on the basis of the link to which the TID or the AC is mapped. For example, a block ACK agreement may be determined on the basis of a mapping between a TID and a link. According to another embodiment, a mapping between a TID and a link may be determined on the basis of a block ACK agreement. Particularly, a block ACK agreement may be set up for a TID mapped to a particular link.

A QOS may be guaranteed via the above-described mapping between a TID and a link. Specifically, an AC or TID having a high priority may be mapped to a link in which a relatively small number of stations operate or a link having a good channel condition. In addition, via the above-described mapping between a TID and a link, a station may maintain a power-saving state for a longer time interval.

Figure 10:
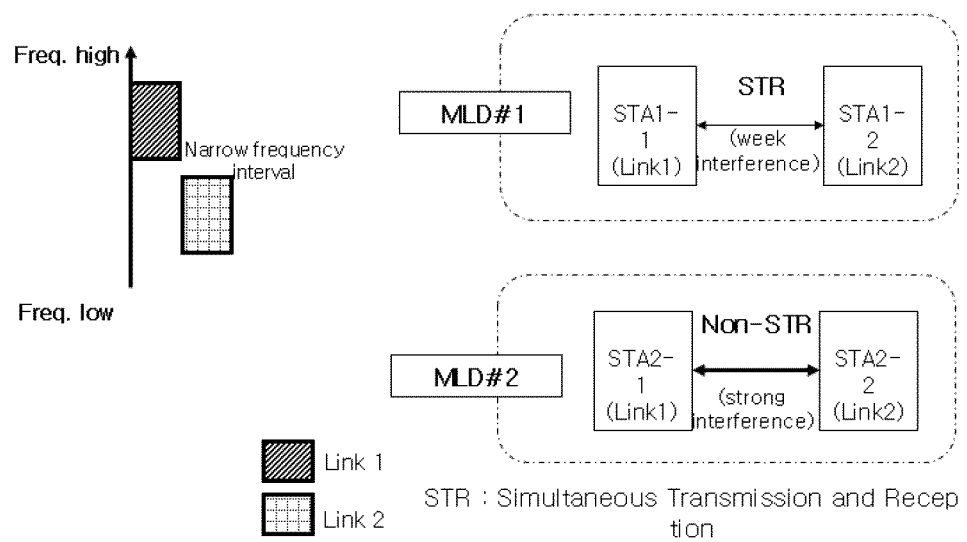
FIG. 10 illustrates a case in which transmissions in different links are simultaneously performed in a multi-link operation according to an embodiment of the present invention.

FIG. 10 illustrates a case in which transmissions in different links are simultaneously performed in a multi-link operation according to an embodiment of the present invention.

According to implementation of a multi-link device, a simultaneous operation may not be supported in multiple links. For example, it may not be supported that the multi-link device simultaneously performs transmission in multiple links, performs reception in multiple links, or performs transmission in any one link and simultaneously performs reception in another link. This is because reception or transmission performed in any one link may affect reception or transmission performed in another link. Specifically, transmission in one link may act as interference in another link. Interference from one link of a single multi-link device applied to another link may be referred to as an internal leakage. The smaller the frequency interval between links, the higher the internal leakage. In a case where the internal leakage is not too high while transmission is performed in any one link, transmission may be performed in another link. In a case where the internal leakage is too high while transmission is performed in any one link, transmission cannot be performed in another link. As such, when the multi-link device simultaneously operates in multiple links, it may be referred to as simultaneous transmit and receive or simultaneous transmission and reception (STR). For example, when the multi-link device simultaneously performs transmission in multiple links, the multi-link device performs transmission in any one link and simultaneously performs reception in another link, or simultaneously performs reception in multiple links, it may be referred to as STR.

If STR is not supported due to interference among multiple stations constituting the MLD, the STAs may be represented to be in a non-STR relationship or an NSTR relationship (a relationship in which STR is not supported).

In this case, whether two STAs (STA 1 and STA 2) support STR may vary according to an interval distance of a pair of links in which the STAs are operated (link 1 in which STA 1 is operated and link 2 in which STA 2 is operated).

Accordingly, if STR is supported between two STAs operated in a specific link pair when the MLD operates each STA in the specific link pair, the specific link pair may be considered as an STR link pair by the MLD. However, if STR is not supported between two STAs operated in different link pairs when the MLD operate STAs in the different link pairs, respectively, the different link pairs may be considered as NSTR link pairs by the MLD.

As such, whether STR between STAs of the MLD is supported is determined according to whether a link pair of the operating STAs corresponds to an STR link pair or an NSTR link pair. However, as described above, the characteristic (the shielding performance, etc.) of each MLD may vary, and thus a specific link pair may be considered as a link pair for which STR is supported for a specific MLD, and may be considered as an NSTR link pair for which STR is not supported for other MLDs.

In embodiments of the present invention to be described below, for convenience of description, STAs operated in an STR link pair of an MLD are referred to (specified) as STAs of an STR MLD, and STAs operated in ran NSTR link pair of the MLD are referred to (specified) as STAs of an NSTR (and non-STR) MLD. That is, in the embodiments to be described below, it may be interpreted that if "STA of a non-STR MLD" is used, the STA refers to one of two STAs operated in the NSTR link of the MLD, and if "STA of STR MLD" is used, the STA refers to one of two STAs operated in the STR link pair of the MLD.

In addition, in regards to the description of whether the STR is supported, the NSTR MLD may have a meaning including not only an MLD having an STA which loses receiving capability but also an MLD having a hardware configuration not supporting transmission/reception.

In other words, when a hardware configuration of a multi-link device (MLD) may correspond to a configuration in which when a specific STA of an MLD performs transmission or reception, hardware resource that can be utilized by other STAs of the MLD are limited. For example, when a specific MLD has a hardware configuration supporting processing for only one PPDU and a specific STA of the specific MLD is performing Rx, the specific MLD cannot support Tx and Rx for another STA in the MLD. Similarly, also in a case where the specific STA of the specific MLD performs Tx, the specific MLD cannot support Tx and Rx for another STA in the MLD.

As such, a device, which corresponds to a multi-link device and can operate STAs in two or more links but cannot support transmission/reception for only one STA at a specific time point, may be called a multi-link single radio MLD (MLSR MLD). Alternatively, as a type of operation mode, an operation mode in which an MLD supports transmission/reception for only one STA may be also called an enhanced multi-link single radio (EMLSR) mode. In this case, the MLD operating in the EMLSR mode may be a multi-radio MLD or an enhanced single-radio MLD. The enhanced single-radio MLD may mean a device which supports data transmission/reception for only one link at a time, but supports CCA and low data rate (for example, encoded at 6 MHz or 24 MHz or less) PPDU transmission/reception for two or more links while having a configuration including separate hardware (low-cost PHY front end, etc.).

In addition, as modification of the EMLSR mode, enhanced multi-link multi-radio (EMLMR), in which an MLD supports transmission/reception for each STA but utilizes a part of an RF chain used by a specific STA for transmission/reception of another STA, may be defined. In a case of EMLMR, if the whole RF chain used by the specific STA is utilized for transmission/reception of another STA, the EMLMR may have the same transmission/reception limitation characteristics as the EMLSR. That is, the MLD operating in the EMLMR mode may perform an operation of supporting transmission/reception for only one link (STA) at a specific time point, regardless of whether STR for links are supported or not, and this may be understood as a similar operation to that of the MLD operating in the EMLSR mode.

That is, links of the MLD operated in the EMLSR/EMLMR mode may be considered to correspond an NSTR link pair.

In this case, the above-described transmission/reception has a meaning including transmission/transmission and reception/reception, that is, is irrelevant to whether STR/NSTR is supported for two links.

For convenience of description, the EMLSR/EMLMR MLD below is utilized to have a meaning including an MLD which can support transmission/reception for only one STA at a specific time point due to hardware restrictions, and an MLD which supports high-speed data frame transmission/reception for only one STA at a specific time point, as a type of an operating mode, even though transmission/reception (processing capability regardless of STR) for two or more STAs can be supported.

The operations of the STR MLD in consideration of the performance restrictions of the NSTR MLD, provided through the above-described embodiments of the present invention can be utilized without change as an operation of an SRT MLD for the MLSR MLD. For example, the STA of the STR MLD may perform transmission to the STA of a multi-link single radio MLD, and then may cancel transmission which has been performed or which is to be performed when the performed transmission is determined to fail or predicted to fail due to the restricted performance of the multi-link single radio MLD STA. In this case, a procedure of identifying whether the transmission has failed due to the restricted performance of the EMLSR/EMLMR MLD may be similar to identifying whether transmission performed for the STA of the NSTR MLD is to fail due to the restricted performance of the NSTR NLD STA.

As described above, the multi-link device may not support STR, or may restrictively support STR. Specifically, the multi-link device may support STR only under a predetermined condition. For example, in a case where the multi-link device operates using a single radio, the multi-link device may not be able to perform STR. In addition, in a case where the multi-link device operates using a single antenna, the multi-link device may not be able to perform STR. In addition, in a case where the magnitude of an internal leakage is detected as being greater than or equal to a predetermined magnitude, the multi-link device may not be able to perform STR.

A station may exchange information relating to STR capability of the station with another station. Specifically, the station may exchange, with another station, information relating to whether the capability that the station simultaneously performs transmission in multiple links or simultaneously performs reception in multiple links is restrictive. Specifically, the information relating to the capability of performing transmission or reception in multiple links is restrictive may indicate whether simultaneous transmission can be performed in multiple links, simultaneous reception can be performed in multiple links, or simultaneous transmission and reception can be performed in multiple links. In addition, the information relating to whether the capability of performing transmission or reception in multiple links is restrictive may be information indicated for each stage. Specifically, the information relating to whether the capability of performing transmission or reception in multiple links is restrictive may be information indicating a stage representing the magnitude of an internal leakage. In a specific embodiment, the information indicating the stage representing the magnitude of an internal leakage may be information indicating a stage representing the magnitude of interference caused due to the internal leakage. In another specific embodiment, the information may be information indicating a stage representing a frequency interval between links that may affect an internal leakage. In addition, the information indicating the stage representing the magnitude of an internal leakage may be information indicating the relationship between an internal leakage and a frequency interval between links for each stage.

In FIG. 10, a first station (STA 1) and a second station (STA 2) may be affiliated with a single non-AP multi-link device. In addition, a first AP (AP 1) and a second AP (AP 2) may be affiliated with the single non-AP multi-link device. A first link (Link 1) may be set up between the first AP (AP 1) and the first station (STA 1), and a second link (Link 2) may be set up between the second AP (AP 2) and the second station (STA 2). In FIG. 10, the non-AP multi-link device may restrictively perform STR. In a case where the second station (STA 2) performs transmission in the second link (Link 2), reception performed by the first station (STA 1) in the first link (Link 1) may be disturbed by transmission performed in the second link (Link 2). For example, in the following case, the reception performed by the first station (STA 1) in the first link (Link 1) may be disturbed by transmission performed in the second link (Link 2). The second station (STA 2) may transmit first data (Data 1) in the second link (Link 2), and the first AP (AP 1) transmits, to the first station (STA 1), a response (ACK for Data 1) to the first data (Data 1). The second station (STA 2) transmits second data (Data 2) in the second link (Link 2). In this case, a transmission time of the second data (Data 2) and a transmission time of the response (ACK for Data 1) to the first data (Data 1) may overlap. In this case, due to the transmission to the second station (STA 2) in the second link (Link 2), interference in the first link (Link 1) may occur. Therefore, the first station (STA 1) may fail to receive the response (ACK for Data 1) to the first data (Data 1).

An operation in which a multi-link device performs channel access is described. A multi-link operation for which there is no detailed description may follow the channel access procedure described through FIG. 6.

A multi-link device may independently perform channel access in multiple links. In this case, the channel access may be backoff-based channel access. When the multi-link device independently performs channel access in multiple links and a backoff counter in the multiple links reaches 0, the multi-link device may start simultaneous transmission in the multiple links. According to another detailed embodiment, when the backoff counter of any one link of the multi-link device reaches 0 and a pre-designated condition is satisfied, the multi-link device may perform channel access not only in a link in which the backoff counter has reached 0 but also in another link in which the backoff counter has not reached 0. Specifically, when the backoff counter of any one link of the multi-link device reaches 0, the multi-link device may perform energy detection in another link in which the backoff counter has not reached 0. In this case, energy greater than or equal to a predetermined magnitude is not detected, the multi-link device may perform channel access not only in a link in which the backoff counter has reached 0 but also in a link in which the energy detection has been performed. Through the above, the multi-link device may start simultaneous transmission in multiple links. The magnitude of a threshold value used for energy detection may be less than the magnitude of a threshold value used for determining whether to decrease a backoff counter. In addition, when determining whether to decrease a backoff counter, the multi-link device may detect any type of signal, as well as, a wireless LAN signal. In addition, in the above-described energy detection, the multi-link device may detect any type of signal, as well as, a wireless LAN signal. An internal leakage may not be detected via a wireless LAN signal. In such a case, the multi-link device may sense a signal detected due to an internal leakage via energy detection. In addition, as described above, the magnitude of a threshold value used for energy detection may be less than the magnitude of a threshold value used for determining whether to decrease a backoff counter. Therefore, although transmission is being performed in one link, the multi-link device may reduce a backoff counter in another link.

According to the degree of interference between links used by a multi-link device, the multi-link device may determine whether a station operating in each link may independently operate. In this case, the degree of interference between links may be the size of interference detected by, when one station performs transmission in one link, another station of the multi-link device. When transmission by the first station of the multi-link device in the first link gives interference having a pre-designated size or greater to the second station of the multi-link device operating in the second link, the operation of the second station may be restricted. Specifically, reception or channel access of the second station may be restricted. This is because, when interference occurs, the second station may fail in decoding of the received signal due to the interference. Furthermore, this is because, when interference occurs, the second station may determine that the channel is being used when the second station performs channel access using the backoff.

In addition, when transmission by the first station of the multi-link device in the first link gives interference having a size smaller than a pre-designated size to the second station of the multi-link device operating in the second link, the first station and the second station may independently operate. Specifically, when transmission by the first station of the multi-link device in the first link gives interference having a size smaller than a pre-designated size to the second station of the multi-link device operating in the second link, the first station and the second station may independently perform channel access. Furthermore, when transmission by the first station of the multi-link device gives interference having a size smaller than a pre-designated size to the second station of the multi-link device operating in the second link, the first station and the second station may independently perform transmission or reception. This is because, when interference having the size smaller than the pre-designated size occurs, the second station may succeed in decoding the received signal even when the interference exists. Furthermore, this is because, when interference having the size smaller than the pre-designated size occurs, the second station may determine that the channel is idle when the second station performs channel access using the backoff.

The degree of interference occurring between stations of the multi-link device may vary depending on a hardware characteristic of the multi-link device as well as the interval between frequency bands of the links in which the stations operate. For example, the degree of internal interference occurring in the multi-link device including an expensive radio frequency (RF) device may be less than that of internal interference occurring in the multi-link device including an inexpensive RF device. Accordingly, the degree of interference occurring between the stations of the multi-link device may be determined based on a characteristic of the multi-link device.

FIG. 10 illustrates that a size of occurring interference varies depending on an interval between frequency bands of links and a characteristic of a multi-link device. In the embodiment of FIG. 10, a first multi-link device (MLD#1) includes a first station (STA 1-1) operating in a first link (Link 1) and a second station (STA 1-2) operating in a second link (Link 2). A second multi-link device (MLD#2) includes a first station (STA 2-1) operating in a first link (Link 1) and a second station (STA 2-2) operating in a second link (Link 2). A frequency interval between the first link (Link 1) and the second link (Link 2) in which the first multi-link device (MLD#1) operates is the same as a frequency interval between the first link (Link 1) and the second link (Link 2) in which the second multi-link device (MLD#2) operates. However, the size of occurring interference may be different due to a difference between a characteristic of the first multi-link device (MLD#1) and a characteristic of the second multi-link device (MLD#2). Specifically, the size of interference occurring in the first multi-link device (MLD#1) may be greater than the size of interference generated in the second multi-link device (MLD#2). As described above, the size of occurring interference may vary depending on the characteristic of the multi-link device, and it may be required to exchange information on whether STR is supported when it is considered that whether STR is supported is different according to each multi-link device.

The multi-link device may signal information on whether STR is supported by the station included in the multi-link device. Specifically, an AP multi-link device and a non-AP multi-link device may exchange information on whether STR is supported by the AP included in the AP multi-link device and whether STR is supported by the STA included in the non-AP multi-link device. In such embodiments, an element indicating whether STR is supported may be used. The element indicating whether STR is supported may be referred to as an STR support element. The STR support element may indicate whether STR is supported by the station of the multi-link device transmitting the STR support element through 1 bit. Specifically, the STR support element may indicate whether STR is supported by each station included in the multi-link device transmitting the STR support element by 1 bit. In this case, a value of the bit may be 1 when the station supports STR, and the value of the bit may be 0 when the station does not support STR. When the multi-link device having transmitted the STR support element includes a first station (STA 1), a second station (STA 2), and a third station (STA 3), the first station (STA 1) and the third station (STA 3) support STR, and the second station (STA 2) does not support STR, the STR support element may include a field having 1011b. It is assumed that stations operating in different frequency bands support STR, and the STR support element may omit signaling indicating whether STR is supported between the stations operating in different frequency bands. For example, the first station (STA, 1) operates in a first link of 2.4 GHZ, and the second station (STA 2) and the third station (STA 3) operate in a second link and a third link of 5 GHz, respectively. In this case, the STR support element may indicate that STR is supported between the second station (STA 2) and the third station (STA 3) by using 1 bit. Furthermore, the STR support element may include only 1 bit when the number of stations signaled by the STR support element is 2.

In a detailed embodiment, the relation between the link located in 2.4 GHZ and the link located in 5 GHz or 6 GHz among the links of the multi-link device may be always determined to be STR. Accordingly, signaling for STR of the link located in 2.4 GHz and the link located in 5 GHz or 6 GHz may be omitted. In the above-described embodiments, the operation described as an operation of a station of a multi-link device may be substituted with an operation of a multi-link device. In addition, in the above-described embodiments, the operation of an AP may be substituted with an operation of a non-AP station, and the operation of a non-AP station may be substituted with an operation of an AP. Accordingly, an operation of an AP of a non-STR multi-link device may be substituted with an operation of a non-AP station of a non-STR multi-link device, and an operation of a non-AP station of an STR multi-link device may be substituted with an operation of an AP of an STR multi-link device. In addition, an operation of a non-AP station of a non-STR multi-link device may be substituted with an operation of an AP of a non-STR multi-link device, and an operation of an AP of an STR multi-link device may be substituted with an operation of a non-AP station of an STR multi-link device.

Each AP included in an AP MLD may transmit a beacon frame in its link. An AP included in the AP MLD may transmit a beacon frame for the same purpose and function as an AP in the conventional Wi-Fi, and may further include, in the beacon frame, information indicating that the AP corresponds to an AP included in the MLD, MLD-unit common information (MLD level information and common information), and basic information of another AP included in the same MLD. In this case, the basic information of another AP may be included in a TBTT information field of an RNR element and transmitted through the beacon frame.

With respect to the beacon frame transmitted by the AP MLD, only MLD-unit common information can be included in the beacon frame so that a problem (beacon bloating) of excessively increasing the size of the beacon frame can be prevented because information on multiple APs included in the same MLD is included in one beacon frame.

However, in a case of an NSTR soft AP MLD, the beacon frame may be transmitted only through some of APs operated by the NSTR soft AP MLD itself. For example, the NSTR soft AP MLD may operate APs in two different links, and transmit a beacon frame through only one link among the two links above if the two links are in an NSTR relationship with each other. In this case, the link in which the NSTR soft AP MLD transmits the beacon frame may have concept of a primary link among the NSTR link pair of the NSTR soft AP MLD. However, the NSTR soft AP MLD may operate a link remaining after excluding the primary link among the NSTR link pair as concept of a non-primary link, and the non-primary link may be a link in which the beacon frame is not transmitted. As such, the reason that the NSTR soft AP MLD operates one link among the NSTR link pair as the primary link and at least one another link as the non-primary link is to prevent a problem which may occur when two different APs are independently operated in the NSTR link pair. A problem that the AP MLD which operates the NSTR link pair is described in detail below with the following embodiments of operation restrictions applied to an NSTR soft AP MLD and an STA MLD associated with the NSTR soft AP MLD. That is, among the link pair to which NSTR is applied, the beacon frame may be transmitted only through the primary link, and the beacon frame cannot be transmitted through the non-primary link.

As described above, since the NSTR soft AP MLD has a restriction of transmitting the beacon frame only in the primary link, and thus it may be allowed for the NSTR soft AP MLD to include, in the beacon frame transmitted in the primary link, more information (on the AP of another link (non-primary link)) than a normal AP MLD. This may be a beacon frame configuration method proposed so that the non-AP MLDs operating the STA also in the non-primary link can operate an STA of the non-primary link on the basis of information on the beacon frame received in the primary link.

For example, the primary link AP of the NSTR soft AP MLD may include a per-STA profile corresponding to an AP (of the same NSTR soft AP MLD) of the non-primary link in a multi-link element of the beacon frame. In this case, the primary link AP of the NSTR soft AP MLD may not have a separate restriction condition when including the per-STA profile corresponding to the AP of the non-primary link. The restriction condition means a condition (a condition that the AP corresponding to the per-STA profile performs (extended) channel switching, channel quicting, etc.) that the normal AP MLD may include the per-STA profile in the beacon frame.

Figure 11:
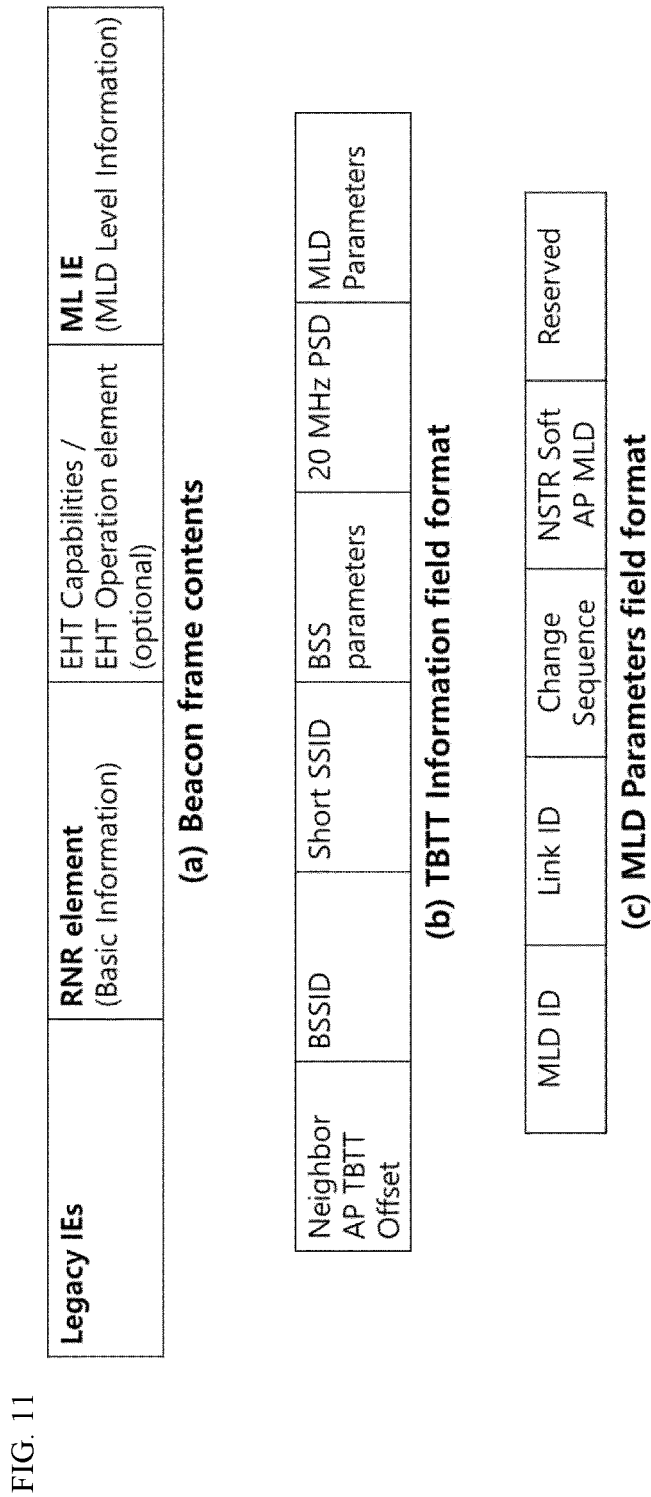
FIG. 11 illustrates an example of beacon frame contents transmitted by an AP of an AP MLD, and a target beacon transmission time (TBTT) information field format included in a reduced neighbor report (RNR) element according to an embodiment of the present invention.

FIG. 11 illustrates an example of beacon frame contents transmitted by an AP of an AP MLD, and a target beacon transmission time (TBTT) information field format included in a reduced neighbor report (RNR) element according to an embodiment of the present invention.

Referring to FIG. 11(a), a beacon frame may include, in legacy IEs, the same parameters and elements as those included in the beacon frame disclosed in 802.11ax of the conventional Wi-Fi. For example, the legacy IEs of the beacon frame may include elements such as a timestamp field, a beacon interval field indicating a beacon transmission interval, a TIM, a DSSS parameter set, an IBSS parameter set, a country, a channel switch announcement, an extended channel switch announcement, a wide bandwidth channel switch, transmission power envelop, supported operating classes, IBSS DFS, ERP information, HR capabilities, an HT operation, VHT capabilities, a VHT operation, SIG beacon compatibility, a short beacon interval, SIG capabilities, an SIG operation, HE capabilities, HE 6 GHz band capabilities, a HE operation, a BSS color change announcement, and spatial reuse parameter set.

In this case, the configuration method and the meaning of the elements and fields included in the legacy IEs field are identical to those of the elements and the fields having the same name, included in the beacon frame disclosed in up to 802.11ax of the conventional Wi-Fi.

In addition, the beacon frame may include a reduced neighbor report (RNR) element for indicating information of a neighbor AP. The RNR element may be used to notify a station of the information of the neighbor AP, and the station may receive the beacon frame and recognize the neighbor AP through the RNR element included in the beacon frame.

Specifically, the RNR element may include an element ID field, a length field, and a neighbor AP information field. Each neighbor AP information field may include a TBTT information header field (2 octet), an operation class field (1 octet), a channel number field (1 octet), and a TBTT information set (variable length) field. In this case, the RNR element transmitted by an AP included an AP MLD may include a TBTT information field format as illustrated in FIG. 11(b) to indicate basic information of another AP included in the same MLD. Unlike the TBTT information field of the RNR element transmitted by the AP in 802.11ax of the conventional Wi-Fi, an RNR element transmitted by an AP included an EHT AP MLD may include an MLD parameters field.

The MLD parameters field may include an MLD ID subfield, a link ID subfield, and a change sequence subfield as illustrated in FIG. 11(c). In this case, when an AP MLD indicates another AP information of the same MLD through a specific neighbor AP information field of the RNR element, an MLD ID subfield included in the specific neighbor AP information field may be configured as 0. That is, to notify to the station that the neighbor AP information field indicates an AP included in the same AP MLD, the AP may configure the MLD ID subfield as a specific value, and the station having received the neighbor AP information field may recognize through a value of the MLD ID subfield that the AP corresponding to the neighbor AP information field and the AP having transmitted the neighbor AP information field are included in the same MLD.

The link ID subfield may correspond to a subfield in which an index determined by an AP MLD is indicated to indicate a link managed by another AP to be indicated through neighbor AP information. The change sequence subfield may be a subfield used to indicate information relating to an update (for example, a critical update) related to a link of another AP. For example, when a value of the change sequence subfield is changed, the station having received the same may recognize that a parameter related to a BSS(or, link) of the corresponding AP has been updated, and may request an updated parameter from the AP to update the corresponding parameter. In this case, when the AP MLD is an NSTR AP MLD corresponding to an MLD not supporting simultaneous transmission or reception (for example, when the AP MLD is an NSTR mobile AP MLD or an NSTR soft AP MLD, that is, when a mobile or the like operates as a soft AP MLD for tethering, etc.), an STA included in an STA MLD may perform a procedure of updating the parameter only through a primary link. That is, to update a parameter of another link (for example, a non-primary link) of another neighbor AP, other than the primary link of the AP MLD, a frame for parameter updating may be transmitted or received only through the primary link.

Hereinafter in the present invention, the NSTR AP MLD may be referred to as an NSTR soft AP MLD or an NSTR mobile AP MLD.

In addition, when the AP is an NSRT AP MLD not supporting simultaneous transmission or reception (for example, when the AP is an NSTR mobile AP MLD or an NSTR soft AP MLD, that is, when a mobile terminal, or the like operates as a soft AP MLD for tethering, etc.), the NSRT AP MLD may include, in a beacon frame, information indicating that the NSTR AP MLD itself is an NSTR AP MLD, and transmit the same. For example, the NSTR AP MLD may configure a value of a specific subfield included in the beacon frame as a specific value (for example, "0" or "1"), and a non-AP STA MLD having received the beacon frame may recognize that the AP MLD having transmitted the beacon frame is the NSTR AP MLD. Accordingly, in a case of not indicating the NSTR AP MLD (for example, in a case of an STR AP MLD, another AP MLD, etc.), the specific subfield for indicating the NSRT AP MLD may be configured as a value (for example, "1" or "0") other than the specific value.

The specific subfield for indicating the NSTR AP MLD may be indicated together with a subfield (for example, MLD level capability) related to capability of the beacon frame, or may be included in a neighbor AP information field related to an AP of a non-primary link of an NSTR AP MLD, and transmitted. For example, the specific subfield for indicating the NSTR AP MLD may be encoded together with a frequency separation for STR/AP MLD type indication corresponding to a capability-related subfield, and indicated. That is, the specific subfield may be encoded together with the frequency separation for STA/AP MLD type indication indicating the distance for supporting STR, and indicated through the beacon frame. In this case, when the corresponding indicator indicates the type of the AP MLD, it may be indicated that the AP MLD having transmitted the beacon frame is the NSTR AP MLD or is not the NSTR AP MLD according to a configured value (for example, when the configured value is "0", it may indicate that the AP MLD is not the NSTR AP MLD, and when the configured value is "1", it may indicate that the AP MLD is the NSTR AP MLD).

AS such, a method in which the subfield indicating the NSTR AP MLD is utilized may be used as a method for explicitly indicating whether the AP MLD is the NSTR AP MLD.

In another example, the NSTR AP MLD may indicate that the NSTR AP MLD itself is the NSTR AP MLD in an implicit method, without directly indicating, through the specific subfield, that the NSTR AP MLD itself is the NSRT AP MLD. Specifically, the NSTR AP MLD may indicate that there are two links supportable by the NSTR AP MLD itself, and simultaneously, may implicitly indicate that the NSTR AP MLD itself is the NSTR AP MLD by indicating that the NSTR AP MLD itself has an NSTR link pair. In this case, to indicate that there are two links supportable by the NSTR AP MLD itself, the NSTR AP MLD may configure a maximum number of simultaneous links subfield included in the beacon frame as 1 (or a pre-promised value indicating two). In this case, to indicate that the NSTR AP MLD itself has the NSTR link pair, the NSTR AP MLD may configure an NSTR link pair present subfield included in the beacon frame as 1 or 0.

The AP MLD may notify, to the non-AP STA MLD through the explicit method or the implicit method, that the AP MLD itself is the NSTR AP MLD, by transmitting the beacon frame as in the above-described method. The non-AP STA MLD may implicitly or explicitly recognize, through the received beacon frame, whether the AP MLD having transmitted the beacon frame is the NSTR AP MLD. If the AP MLD having transmitted the beacon frame is the NSTR AP MLD (that is, when the beacon frame indicates, in the explicit or implicit method, that the AP MLD is the NSTR AP MLD), the non-AP STA MLD may perform a procedure for association or setup with the NSTR AP MLD only through a link in which the beacon frame is received. That is, the non-AP STA MLD may perform transmission or reception of a frame for association or setup with the NSTR AP MLD only through a link (for example, a primary link) in which the beacon frame is received. For example, the transmission or reception of the frame for the association or setup with an AP connected through a link other than the primary link, included in the NSTR AP MLD, may be performed only through the primary link. In this case, an (ML) (re)association request frame transmitted by the non-AP STA MLD may be transmitted through a non-primary link other than the primary link.

In this case, the NSTR AP MLD may not indicate information relating to an AP of the non-primary link in the RNR element of the beacon frame (transmitted in the primary link), so as to prevent the non-AP STA MLDs from attempting the setup procedure in the non-primary link. That is, the beacon frame transmitted by the AP of the NSTR AP MLD may not include/indicate a neighbor AP information field for the AP (of the same MLD) of another link. In this case, after receiving the beacon frame, the non-AP STA MLDs fail to identify information on the AP of the non-primary link, and thus may not attempt step for the NSTR AP MLD in the non-primary link. In this case, the non-AP STA MLD having received the beacon frame not including the neighbor AP information field for the AP of the non-primary link from the NSTR AP MLD may implicitly recognize, as described above, that a counterpart AP is the NSTR AP MLD on the basis that there are two simultaneous support links of the AP having transmitted the beacon frame and no information on another AP of the same MLD is indicated.

When receiving an (ML) (re)association request frame from an STA (MLD), a general AP MLD needs to transmit an (ML) association response frame through a link in which the (ML) association request frame is received. However, the NSTR AP MLD may be allowed to perform, through a primary link, responding to the (ML) association request frame received through a non-primary link (i.e., to respond with the (ML) association response frame in the primary link).

As described above, this may be an operation allowed because an operation in which the NSTR AP MLD performs transmission through the non-primary link is somewhat restricted compared to a general AP. To described in more detail, in a case of the NSTR AP MLD, when a response to the (ML) association response frame is transmitted through the non-primary link, there is an operation restriction that the transmission needs to start together in the primary link. As being considered in other embodiments of the present invention, this may be an operation restriction considered to prevent the AP of the primary link from being in a BLIND state.

Therefore, when receiving the (ML) (re)association request frame through the non-primary link, the NSTR AP MLD may respond with the (ML) (re)association response frame through the primary link, or may respond with the (ML) (re)association response frame through both the primary link and the non-primary link. That is, an STA MLD having transmitted the (ML) (re)association request frame through the non-primary link of the NSTR AP MLD may recognize that the response to the request frame having requested by the STA MLD itself is to be received through the primary link, and may wait for the reception of the (ML) (re)association response frame in the primary link.

That is, the RNR element transmitted by the AP through the beacon frame may include a specific TBTT information field including the MLD parameters field. In this case, when an MLD ID of the MLD parameters field is configured as "0", the STA MLD may recognize that the AP corresponding to the neighbor AP information field including the corresponding MLD parameters field is included in the AP MLD in which the AP having transmitted the beacon frame is included. That is, the STA MLD may recognize that the corresponding neighbor AP information field indicates information on another AP included in the same AP MLD as the AP having transmitted the beacon frame. In this case, a method for interpreting/obtaining the same by the STA MLD may be identical/similar to an operation performed by the conventional STAs after receiving the RNR element.

However, in the case of the NSTR soft AP, the beacon frame is not transmitted in the non-primary link, and thus it may be impossible to indicate information related to the beacon frame of another AP (the AP of the non-primary link) through the RNR element. To describe in more detail, the NSTR soft AP MLD does not transmit the beacon frame through the AP of the non-primary link, and thus the NSTR soft AP MLD cannot indicate information on the beacon frame when indicating AP basic information of the non-primary link in the RNR element. For example, in the non-primary link in which the beacon frame is not transmitted, there is no information corresponding to the TBTT information count, TBTT information length, and neighbor AP TBTT offset subfields. Therefore, when transmitting the RNR element through the AP of the primary link, the NSTR soft AP MLD may need to set, to a pre-configured value, the TBTT-related field of the neighbor AP information field corresponding to the AP of the non-primary link.

The neighbor AP TBTT offset subfield of the TBTT information field (see FIG. 11(b)) is a subfield indicating information related to a next TBTT of another AP to be indicated. That is, the neighbor AP TBTT offset subfield included in the neighbor AP information field may include information on the next TBTT of the AP corresponding to the neighbor AP information field. For example, when AP 1 for transmitting a beacon frame indicates information on AP 2 through an RNR element (through a neighbor AP information field), a neighbor AP TBTT offset subfield corresponding to AP 2 indicates that the next TBTT of AP 2 has a difference in time units (TUs) (1024 us) compared to the immediately preceding TBTT of AP 1. In this case, a value indicated by the neighbor AP TBTT offset subfield is a value obtained by rounding down a TBTT offset to a neighboring integer. That is, when the AP indicates a value of 10 in the neighbor AP TBTT offset subfield of another AP, the next TBTT of another AP may have a time interval of 10 TUs or more to 11 TUs or less with reference to the previous TBTT of the AP.

However, when the primary link AP of the NSTR soft AP MLD sets a value for the neighbor AP TBTT offset subfield (1-octet) corresponding to the AP of the non-primary link, the value of the subfield may need to be set to a pre-configured value (for example 254 or 255). This may be because a target beacon transmission time (TBTT) corresponding to a time scheduled for transmission of the next beacon frame cannot be determined due to no transmission of the beacon frame in the non-primary link in a case of the NSTR soft AP. That is, the beacon frame transmitted by the NSTR soft AP MLD in the primary link may need to set, to 254 and/or 255, the neighbor AP TBTT offset subfield corresponding to the AP of the non-primary link through the RNR element. In this case, the neighbor AP TBTT offset subfield corresponding to the non-primary link may exist in the TBTT information field including the MLD parameters field having the MLD ID subfield set to 0.

Accordingly, when the non-AP STA MLD identifies, from the specific neighbor AP information field of the RNR element included in the beacon frame, the TBTT information field having the MLD ID subfield set to 0 and the TBTT offset subfield indicated as 254 and/or 255 after receiving the beacon frame of the NSTR soft AP MLD, the non-STA MLD may recognize that the specific neighbor AP information field indicates information on the AP (NSTR soft AP MLD) operated in the non-primary link of the NSTR soft AP MLD. As such, the non-AP STA MLD having received the beacon frame of the NSTR soft AP MLD should not transmit a probe request frame or an ML probe request frame to the NSTR soft AP MLD through the non-primary link when identifying the information on AP MLD operated in the non-primary link of the corresponding NSTR AP MLD.

In addition, when the non-AP STA MLD has recognized that the received beacon frame is the beacon frame transmitted by the MLD and the neighbor AP TBTT offset subfield corresponding to another AP in the same MLD as the AP (reporting AP) having transmitted the beacon frame is indicated as 254 and/or 255, the non-AP STA MLD should not transmit the probe request frame and the ML probe request frame to another AP.

In addition, when the non-AP STA MLD has recognized that the received beacon frame is the beacon frame transmitted by the MLD and the neighbor AP TBTT offset subfield corresponding to another AP of the same MLD as the AP (reporting AP) having transmitted the beacon frame is indicated as 254 and/or 255, the non-AP STA MLD should not transmit the probe request frame and the ML probe request frame to another AP.

MLD AP TBTT Offset Indication

In the above-described embodiments of the present invention, it is mentioned that a beacon frame transmitted by an NSTR soft AP MLD may indicate a neighbor AP TBTT offset subfield corresponding to an AP of a non-primary link as a pre-configured value (254 and/or 255). However, the neighbor AP TBTT offset subfield may be indicated as 254 or 255 not even in a case of corresponding to the AP of the non-primary link of the NSTR soft AP MLD. For example, when a TBTT offset of another AP identified by an AP transmitting the beacon frame is equal to or greater than 254 TUs (254 TUs or greater than 254 TUs), the AP may indicate the neighbor AP TBTT offset subfield corresponding to another AP as 254 in the beacon frame.

In addition, when the AP transmitting the beacon frame cannot accurately identify the TBTT offset of another AP, the AP may indicate the neighbor AP TBTT offset subfield corresponding to another AP as 255.

However, since the AP of the MLD may always recognize TBTT offsets of other APs within the MLD, the neighbor AP TBTT offset subfield corresponding to another AP (of the same MLD) should not be indicated (configured) as 255 when being indicated (configured) through an RNR element.

Specifically, the neighbor AP information field included in the RNR element of the beacon frame may include a neighbor AP TBTT offset subfield indicating an offset between times in which the beacon frame is transmitted. In this case, the neighbor AP TBTT offset subfield indicates an offset value between a time point at which the beacon frame is transmitted and a time point at which a next beacon frame is transmitted by an AP corresponding to a neighbor AP TBTT offset subfield among multiple APs included in the AP MLD (NSTR or STR AP MLD). In this case, the neighbor AP TBTT offset subfield cannot be configured as a specific value according to a specific condition.

For example, when being included in the same AP MLD as the AP having transmitted the beacon frame, the neighbor AP TBTT offset subfield cannot be configured as a specific value (for example, "255"). In this case, the size of the neighbor AP TBTT offset subfield may be 8 bits, and in this case, the neighbor AP TBTT offset subfield cannot be configured as the largest value which can be indicated by the neighbor AP TBTT offset subfield (in a case of 8 bits, the subfield corresponds to each of values from 0 to 255, and thus a maximum value of the offset which can be indicated by 8 bits may be 255). However, when not being included in the same AP MLD as the AP having transmitted the beacon frame (for example, when the AP is a legacy AP), the neighbor AP TBTT offset subfield may be configured as a specific value (for example, "255").

In a similar embodiment, a value configured for the neighbor AP TBTT offset subfield may be differently interpreted according to a specific condition.

For example, when the neighbor AP TBTT offset subfield is configured with a specific value (for example, when the subfield is configured with "254"), the configured value may be differently interpreted as "254" or "254" or greater according to a specific condition.

Specifically, when an AP corresponding to a neighbor AP information field including the neighbor AP TBTT offset subfield is included in the same AP MLD as or a different MLD from the AP having transmitted the beacon frame and the neighbor AP TBTT offset subfield is configured with a specific value (for example, "254"), the station may interpret the value indicated by the neighbor AP TBTT offset as 254 TUs. However, when the AP is not included in the same AP MLD as or a different MLD from the AP having transmitted the beacon frame (for example, the AP is a legacy AP or is an AP not included in the MLD, etc.) and the neighbor AP TBTT offset subfield is configured with a specific value (for example, "254"), the station may interpret the value indicated by the neighbor AP TBTT offset subfield as 254 TUs or 254 TUs or greater.

In general, the reason why the conventional AP includes basic information of neighbor APs together with TBTT offset information and transmit the same through the beacon frame is to assist STAs having received the beacon frame in promptly acquiring basic information of other APs and more efficiently receiving the beacon frame of another AP by using the identified TBTT offset information.

However, the neighbor AP TBTT offset subfield included in the conventional beacon frame includes 1 octet, and is designed in the form in which only a TBTT offset corresponding to a maximum of 254 TUs can be indicated. In consideration of the maximum TBTT offset ((2^16) or (2^16)-1 TUs in consideration of a configurable beacon interval) that another AP can have, this may be a design of a neighbor AP TBTT offset subfield in the form in which the indicatable information and the overhead of the beacon frame are compromised through exclusion of support for information in a case having a TBTT offset of 254 TUs or more.

However, when the AP MLD indicates information on another AP in the MLD through the beacon frame, an additional MLD AP TBTT offset subfield may be included and transmitted to more accurately notify of the TBTT offset of another AP. When the AP MLD transmits the beacon frame, the MLD AP TBTT offset subfield may be included in the TBTT information field corresponding to another AP in the same MLD. In this case, when both the neighbor AP TBTT offset subfield and the MLD AP TBTT offset subfield are indicated in a specific TBTT information field, the neighbor AP TBTT offset may be indicated by a pre-configured value (254 or 255).

The MLD AP TBTT offset subfield corresponds to a 2-octet sized subfield, and may be utilized to indicate a TBTT offset value when the TBTT offset between an AP (reporting AP) having transmitted the beacon frame and another AP (reported AP) of the same MLD exceeds 254 TUs. More specifically, when the AP MLD transmits the beacon frame, a TBTT offset of another AP in the same MLD exceeds 254 TUs, and an accurate TBTT offset thus cannot be indicated through the existing neighbor AP TBTT offset subfield, the MLD AP TBTT offset subfield may be limitedly included in the TBTT information field.

When the STA MLD has identified the TBTT information field including the MLD AP TBTT offset subfield from the RNR element included in the beacon frame received from a specific AP, the STA MLD may identify the TBTT offset of the AP corresponding to the TBTT information field on the basis of a value indicated by the MLD AP TBTT offset subfield. In this case, to identify whether TBTT information fields included in the beacon frame are included in the MLD AP TBTT offset subfield, the STA may identify the same on the basis of a value of the TBTT information length subfield (in a TBTT information header (sub)field of each neighbor AP information field) corresponding to each TBTT information field. That is, when the STA recognizes that the MLD AP TBTT offset subfield is included in the TBTT information field, on the basis of a value of a TBTT information length subfield, the STA may identify the TBTT offset of the AP corresponding to the TBTT information field on the basis of a value indicated by the MLD AP TBTT offset subfield. In this case, when 0 or a pre-configure value (or a value equal to or less than 254) is indicated through the MLD AP TBTT offset subfield of a specific TBTT information field, the STA MLD may identify the TBTT offset of the AP corresponding to the specific TBTT information field on the basis of a value of the neighbor AP TBTT offset subfield.

FIG. 12 illustrates another example of a TBTT information field format according to an embodiment of the present invention.

Referring to FIG. 12, a TBTT information field may include an MLD AP TBTT offset subfield. The MLD AP TBTT offset subfield may be only included in a beacon frame transmitted by an AP of an AP MLD. In addition, the MLD AP TBTT offset subfield may be included only in a TBTT information field corresponding to another AP of the same MLD as the AP which transmits the beacon frame.

For example, in a beacon frame transmitted by a specific AP of the AP MLD, to indicate that a TBTT offset of another AP of the same MLD is 300 TUs, the TBTT information field corresponding to another AP may be utilized as a format including the MLD AP TBTT offset subfield. In this case, a neighbor AP TBTT offset subfield of the TBTT information field corresponding to another AP may be indicated by 254 or 255, and the MLD AP TBTT offset subfield may be indicated by a value corresponding to 300 TUs (for example, 300, 299, or (300-254)). In this case, the above-described MLD AP TBTT offset subfield is a subfield name provided as an example, and a subfield having the same use may be defined as another name.

FIG. 13 illustrates an example of a TBTT information length subfield indicating a TBTT information field including an MLD AP TBTT offset subfield according to an embodiment of the present invention.

Referring to FIG. 13, according to a TBTT information length subfield, the types of contents included in a TBTT information field may be indicated. The TBTT information length subfield may be a subfield included in a TBTT information header field existing in neighbor AP information fields included in an RNR element. That is, multiple neighbor AP information fields may be included in the RNR element transmitted through a beacon frame, and the TBTT information field included in each neighbor AP information field has a structure including different amounts and types of contents. In this case, since the TBTT information field included in each neighbor AP information field may include different amounts and types of contents, information relating to the content (and format) indicated through each TBTT information field is indicated through the TBTT information header field.

That is, an STA may perform parsing of each neighbor AP information field in the RNR element of the beacon frame received through the AP, on the basis of information indicated by the TBTT information header field. In this case, each parsed neighbor AP information field may indicate information on a neighbor AP or another AP of the same MLD. In this case, when a value of the TBTT information length subfield included in the TBTT information header field means configuration of a content including an MLD AP TBTT offset subfield as illustrated in FIG. 13, the STA may identify a TBTT offset of the AP corresponding to the corresponding TBTT information field, on the basis of the value indicated by the MLD AP TBTT offset subfield.

As another method, a restriction that the AP MLD needs to manage a TBTT offset between APs operated by the AP MLD itself so that the TBTT offset is to be 254 TUs or less and does not exceed 255 TUs.

In this case, the AP MLD may need to manage a TBTT time point difference between APs belonging to the MLD so that the difference does not exceed 254 TUs or 255 TUs, by adjusting a TBTT time point (setup) operated by each AP and/or a beacon interval of APs operated by the AP MLD itself in each link. In this case, the beacon interval and TBTT time point adjustment, etc. is an example for a method for changing a TBTT interval between the respective APs in the MLD, and another implementation of adjusting a TBTT offset so that the TBTT offset does not exceed a specific time value (254 TUs or 255 TUs) may be applied. In addition, a method for managing the TBTT time point difference between the respective APs operated by the AP MLDs itself not to exceed the specific interval (254 TUs or 255 TUs) may not be separately defined.

As such, when the AP MLD adjusts the TBTT time point difference between the respective APs operated by the AP MLD itself to 254 TUs or less or below 255 TUs, as the neighbor AP TBTT offset subfield value transmitted for another AP of the same MLD in the RNR element transmitted by a specific AP through a beacon, only a value of 253 or a value of 254 or less may be indicated. To described in more detail, when a specific AP MLD manages a TBTT time point difference of APs operated by the AP MLD itself so that the difference is 254 TUs or less or is below 255 TUs, subfields corresponding to other APs belonging to the same AP MLD (the specific AP MLD) among the neighbor AP TBTT offset subfields transmitted by a specific AP belonging to the specific AP MLD may indicate (have) only a value of 254 TUs or less.

As described above, when the AP MLD maintains the TBTT time point difference of the respective APs operated by the AP MLD itself so that the difference is to be 254 TUs or less or is to be below 255 TUs, a non-AP STA may need to interpret the neighbor AP TBTT offset subfield of the beacon frame received from the AP of the AP MLD in a method different from the above-described interpretation method. In this case, the above-described interpretation method may mean an interpretation method when the neighbor AP TBTT offset subfield value is indicated as 254 TUs. That is, the above-described interpretation method may be interpretation that a time interval between a previous TBTT of a reporting AP and a next TBTT (a TBTT transmitted after the previous TBTT) of a reported AP is 254 TUs or more when the neighbor AP TBTT offset subfield value is indicated as 254 TUs. In this case, another interpretation method above may be interpretation that a time interval between a previous TBTT of a reporting AP and a next TBTT (a TBTT transmitted after the previous TBTT) of a reported AP is 254 TUs or more and less than 255 TUs when the neighbor AP TBTT offset subfield value is indicated as 254 TUs. Alternatively, another interpretation method above may be interpretation that a time interval between a previous TBTT of a reporting AP and a next TBTT (a TBTT transmitted after the previous TBTT) of a reported AP is 254 TUs when the neighbor AP TBTT offset subfield value is indicated as 254 TUs. This may be an interpretation method reflecting operation characteristics of the AP MLD and the existing neighbor AP TBTT offset subfield has a meaning of "254 TUs or more" since the TBTT time difference between the respective APs operated by the AP MLD is adjusted to 254 TUs or less or less than 255 TUs by the AP MLD.

That is, when the non-AP STA receives the neighbor AP TBTT offset subfield for another AP of the same AP MLD through the beacon received from the specific AP of the AP MLD and the subfield value is 254, it may be interpreted that the TBTT offset of another AP is 254 TUs (or 254 TUs or more and less than 255 TUs).

Even in a case where the non-AP STA receives the beacon frame from the AP of the AP MLD, when the neighbor AP TBTT offset subfield other than that for APs of the same AP MLD among the neighbor AP TBTT offset subfields included in the beacon frame is indicated as 254, that is, when the neighbor AP TBTT offset subfield for the legacy AP or an AP other than the MLD, it needs to be interpreted that the TBTT offset of 254 TUs or more is indicated.

In this case, a method for distinguishing, by the non-AP MLD, whether the specific neighbor AP TBTT offset subfield is for another AP of the same AP MLD may be based on information of the MLD parameters subfield included in the same TBTT information field as the specific neighbor AP TBTT offset subfield. More specifically, when an MLD ID subfield value of the MLD parameters subfield included in the same TBTT information field as a specific neighbor AP TBTT offset subfield is 0, the non-AP STA may interpret that the specific neighbor AP TBTT offset subfield is an AP of the same MLD as the AP having transmitting the beacon frame.

That is, when the neighbor AP TBTT offset subfield of the TBTT information field having the MLD ID subfield value corresponding to 0 is indicated as 254, the non-AP STA may interpret that the neighbor AP TBTT offset subfield indicates a TBTT offset in a range of 254 TUs or more and less than 255 TUs. In this case, to interpret the neighbor AP TBTT offset subfield, the non-AP may additionally consider whether the beacon frame includes the ML element (whether the AP having transmitted the beacon frame is the MLD).

That is, when the neighbor AP TBTT offset subfield of the TBTT information field having the MLD ID subfield value not corresponding to 0 (for example, 1 to 255) is indicated as 254, the non-AP STA may interpret that the neighbor AP TBTT offset subfield indicates a TBTT offset of 254 TUs or more.

Non-Primary Link Setup and Management

As described above, an NSTR AP MLD cannot transmit a beacon frame, a probe response frame, and a multi-link (ML) probe response frame through a non-primary link. Accordingly, an STA MLD to be connected to the NSTR AP MLD needs to transmit a (ML) probe request frame through only a link in which the NSTR AP MLD has transmitted a beacon frame.

An ML probe request frame transmitted by an STA of an EHT non-AP STA MLD may include not only information included in a probe request frame transmitted by the conventional HE STA, but also EHT capability information and a multi-link element. In this case, the multi-link element included in the ML probe request frame may take a role of requesting, from an AP MLD, additional information for an AP of another link by an MLD transmitting the ML probe request frame.

For example, when the non-AP STA MLD transmits the ML probe request frame, the non-AP STA MLD may request, from an AP MLD, to additionally respond with complete information or partial information for the AP of another link through the multi-link element of the ML probe request frame. That is, the non-AP STA MLD may request, from the AP MLD, to transmit all or a part of a parameter related to the link of another AP included in the same AP MLD to the AP receiving the ML probe request frame.

For example, when all or a part of the parameter related to the AP connected through a non-primary link is updated, a station included in the non-AP STA MLD may request transmission of all or a part of the updated parameter related to another AP of the non-primary link to the AP connected through a primary link.

In this case, when the complete information is requested/transmitted as a response, it means that information having the same level as an AP (reporting AP) responding with the ML probe response frame is requested from/transmitted as a response to an AP (reported AP) of another link. In this case, when the partial information is requested/transmitted as a response, it means that the information of the AP of another link is transmitted as a response only to the information requested by the STA.

When additional information relating to the AP of another link is requested in the ML probe request frame received through a specific link, the AP MLD transmitting the beacon frame may respond with, through the ML probe response frame, not only information on the AP of the specific link but also the requested additional information relating to the AP of another link.

In this case, when the STA MLD has requested complete information on the AP of another link while transmitting the ML probe request frame in a specific link, the AP MLD may need to provide, through an ML probe response frame transmitted as a response in the specific link, information on the AP of another link at the same level as that of the information on the AP of the specific link. In other words, the STA MLD having received the complete information of the AP of another link through a specific link may acquire, with respect to the AP of another link, information at the same level as that when an ML probe response is directly received from the AP of another link.

In this case, when the STA MLD has requested partial information on the AP of another link while transmitting the ML probe request frame in a specific link, the AP MLD may provide, through an ML probe response frame transmitted as a response in the specific link, only requested information (information of a requested element) among the information of the AP of another link. In other words, the STA MLD having received the partial information of the AP of another link through a specific link may additionally acquire only information requested with respect the AP of another link by the STA MLD itself. In this case, the STA MLD requesting the partial information of the AP of another link may transmit the ML probe request frame by including information (which may be indicated by a requested element IDs field) indicating information to be additionally acquired, together with a link ID corresponding to another link. Accordingly, when the ML probe request frame received through a specific link includes information (request element IDs field) indicating information on another link, the AP MLD may additionally indicate, through the ML probe response frame, information indicated with respect to another link.

In this case, when transmitting an ML probe request frame through a specific link, the STA MLD may configure, as 0 or 1, a complete profile subfield (of a per-STA control field included in a multi-link element) corresponding to another link to indicate whether complete information or partial information for another link is requested.

In this case, additional information (complete and partial) of another AP may be transmitted through a per-STA profile included in a multi-link element of an ML probe response frame. The per-STA profile is a field included in the multi-link element with 0 or more than 0, and may include information of another STA (a non-AP STA of an AP) existing in the same MLD as an STA (a non-AP STA of an AP) transmitting a frame including the multi-link element. In this case, the per-STA profile may include a complete profile subfield, and complete information (information having the same level as the STA (the AP and the non-AP) transmitting the frame including the multi-link element) of another STA (the AP and the non-AP STA) corresponding to the per-STA profile having the complete profile subfield indicated as 1 may be acquired through the corresponding per-STA profile. However, parameters/elements meaning the same information as the STA (the AP and the non-AP) having transmitted the corresponding per-STA profile may be omitted by an inheritance rule. The inheritance rule may mean succession and utilization of values of the already indicated same parameter and element (indicated for another STA (the AP and the non-AP)) in a case where the same parameter and element are not indicated to prevent repeated indication of the corresponding parameter and element. That is, when a value of parameter 1 is indicated for STA 1 and a value of parameter 1 is not indicated for STA 2, it may be interpreted, through the inheritance rule, that the value of parameter 1 for STA 2 is indicated to be identical to the value of parameter 1 for STA 1.

In this case, a per-STA profile subelement included in a multi-link element transmitted by an NSTR AP MLD may not include a beacon interval subfield for indicating an interval at which a beacon is transmitted. That is, when indicating the per-STA profile subelement corresponding to an AP of a non-primary link in the multi-link element, the NSTR AP MLD may need to configure a beacon interval present subfield as 0. This may be because a period of a beacon frame does not separately exist since an AP operated in the non-primary link of the NSTR AP MLD transmits no beacon frame. That is, the per-STA profile subfield (of the probe response and association response frame) corresponding to the non-primary link AP of the NSTR AP MLD may have a beacon interval present subfield indicated as 0 even though a complete profile subfield (of the per-STA control field) is indicated as 1. That is, beacon interval information of the AP of the non-primary link does not exist even when the complete information is indicated.

Similarly, DTIM information (DTIM count and DTIM period information) of the AP of the non-primary link may not exist even when the complete information is indicated. That is, the per-STA profile corresponding to the non-primary link AP of the NSTR AP MLD may have a DTIM info present subfield indicated 0 even though the complete profile subfield (of the per-STA control field) is indicated as 1.

That is, a beacon is not transmitted through a non-primary link, and thus even when the non-AP STA MLD requests all information (or all updated information) of another AP of the non-primary link through the AP of the primary link (that is, when the complete information is configured as "1"), the beacon interval and DTIM information of the AP of the non-primary link may not exist in the ML probe response frame. That is, the beacon interval and DTIM information may not be included in the per-STA profile subelement of the AP of the non-primary link included in the ML probe response frame.

In this case, even though all information (or all updated information) of another AP of the non-primary link is requested, the AP MLD may not include, in the ML probe response frame, the beacon interval and DTIM information of the AP of the non-primary link. Accordingly, in this case, the AP MLD may transmit the beacon interval present subfield and DTIM info present subfield by configuring a value (for example, "0") indicating that the respective fields are not included.

In a case of the NSTR AP MLD, the beacon frame is not transmitted in the non-primary link, and thus when information on the AP of the non-primary link is indicated, the DTIM information and the beacon interval information may not be indicated. That is, the NSTR AP MLD may need to always indicate, as 0, the DTIM info present subfield of the per-STA profile (more precisely, an STA control field) corresponding to the AP of the non-primary link. That is, the NSTR AP MLD may need to always indicate, as 0, the beacon interval present subfield in the per-STA profile corresponding to the AP of the non-primary link. Accordingly, even when the NSTR AP MLD receives an ML probe request frame for requesting complete information, or receives a (ML) (re)association request frame from the non-AP STA
MLD, the NSTR AP MLD may need to always indicate, as 0, the beacon interval present subfield and the DTIM info present subfield of the per-STA profile corresponding to the AP of the non-primary link.

Alternatively, no beacon frame is transmitted in the non-primary link, and thus the NSTR AP MLD may need to configure beacon interval, DTIM count, and
DTIM interval subfields as a pre-promised value in the per-STA profile corresponding to the AP of the non-primary link. This may be an operation considered to maintain the same per-STA profile configuration as a general AP MLD (for example, STA AP MLD) when the NSTR AP MLD transmits (responds with) complete information of the AP of the non-primary link. That is, the STA MLD may request complete information of a specific link by using an ML probe request frame, etc. from the AP MLD, and then expect that complete information is to be received as a response to the AP of the specific link in a responding response frame. In this case, when complete information transmitted by the NSTR AP MLD as a response and complete information transmitted as a response have different per-STA profile configures from each other, implementation complexity of a process of acquiring information through the per-STA profile by the STA MLD may be increased. Accordingly, even though the AP of the non-primary link transmits no beacon frame, the NSTR AP MLD may use, when responding with complete information of the non-primary link, a per-STA profile having the same configuration as a per-STA profile used when a general AP MLD responds with complete information. In this case, the per-STA profile corresponding to the non-primary link AP of the NSTR AP MLD may have a beacon interval subfield, a DTIM count subfield, and a DTIM interval subfield, each of which is configured with a pre-configured value. For example, when transmitting complete information of the AP of the non-primary link, the NSTR AP MLD may configure all of the respective bits of the beacon interval subfield of the non-primary link as 0 or 1, or according to a pre-promised scheme. For example, when transmitting complete information of the AP of the non-primary link, the NSTR AP MLD may configure all of the respective bits of the DTIM count subfield of the non-primary link as 0 or 1, or according to a pre-promised scheme. For example, when transmitting complete information of the AP of the non-primary link, the NSTR AP MLD may configure all of the respective bits of the DTIM interval subfield of the non-primary link as 0 or 1, or according to a pre-promised scheme.

Alternatively, no beacon frame is transmitted in the non-primary link, and thus the NSTR AP MLD may configure beacon interval, DTIM count, and DTIM interval subfields with a value related to a beacon frame of the primary link in the per-STA profile corresponding to the AP of the non-primary link. This may be an operation considered to maintain the same per-STA profile configuration as described above. In this case, the per-STA profile corresponding to the non-primary link AP of the NSTR AP MLD may have a beacon interval subfield, a DTIM count subfield, and a DTIM interval subfield, each of which is configured with a value related to a beacon frame transmitted in the primary link. For example, when transmitting complete information of the AP of the non-primary link, the NSTR AP MLD may configure the beacon interval subfield of the non-primary link as a value indicating (meaning) a beacon interval of the primary link. For example, when transmitting complete information of the AP of the non-primary link, the NSTR AP MLD may configure the DTIM count subfield of the non-primary link as a DTIM count value of the primary link. For example, when transmitting complete information of the AP of the non-primary link, the NSTR AP MLD may configure the DTIM interval subfield of the non-primary link as a value indicating (meaning) a DTIM interval of the primary link.

Alternatively, no beacon frame is transmitted in the non-primary link, and thus the NSTR AP MLD may configure beacon interval, DTIM count, and DTIM interval subfields in the per-STA profile corresponding to the AP of the non-primary link with a value having a special purpose. To describe in more detail, the beacon interval subfield of the non-primary link may be configured with a value (a virtual beacon internal) having a special purpose by the AP MLD, for example, a value of calculation. The beacon interval of the conventional Wi-Fi literally means a value related to a time interval in which a beacon frame is transmitted, but is utilized as time units for various BSS operations. For example, a unit such as JointFailureTimeout and QueryFailureTimeout primitive is defined as a beacon interval, and a listen interval field, a PRAW start offset subfield, an AID request interval field, an AID switch count field, an AID response interval field, a minimum transmission interval subfield, a channel quality measurement duration, a color switch countdown subfield (of a BSS color change announcement element), etc. indicate an interval/duration by utilizing a beacon interval (or TBTT) as a basic unit. As such, the beacon interval has a meaning of a value related to an interval in which a beacon frame is actually transmitted, but is a value utilized as a unit of various primitives and fields, and thus even though a beacon frame is not actually transmitted in the non-primary link, a beacon interval for the non-primary link may need to be defined (indicated or configured) for the use of being utilized as units of the above-described primitives/subfields.

That is, even though no beacon frame is transmitted in the non-primary link, the NSTR AP MLD may indicate the beacon interval subfield of the per-STA profile corresponding to the AP of the non-primary link as a beacon interval value for utilizing a time unit of the non-primary link. In this case, the non-AP MLDs may recognize (identify or calculate) a duration and an interval of the above-described primitives and fields (for utilizing the beacon interval as a time unit) on the basis of a value indicated by the beacon interval subfield of the per-STA profile corresponding to the AP of the non-primary link. In this case, the DTIM interval subfield and the DTIM count subfield of the per-STA profile corresponding to the AP of the non-primary link may be also configured according to the operating purpose of the BSS of the AP MLD, and the non-AP MLD operated by the STA in the non-primary link may need to operate on the basis of the configured value when operating the STA of the non-primary link.

The above-described method for configuring a subfield (a beacon interval, a DTIM count, a DTIM interval, etc.) related to the beacon of the non-primary link of the NSTR AP MLD may be also applied the same to not only the per-STA profile transmitted in the primary link but also other frames and subfields (transmitted in the primary link or the non-primary link) including information related to the beacon of the non-primary link.

In addition, the non-AP STA MLD to be associated with the NSTR AP MLD may need to utilize a unit of a listen interval field transmitted when requesting setup of for the primary link and the non-primary link, as a beacon interval of the primary link of the NSTR AP MLD. That is, the non-AP STA MLD transmitting the listen interval field to the NSTR AP MLD may need to calculate and configure the unit of the listen interval field as the beacon interval of the AP operating in the primary link of the NSTR AP MLD. In this case, the listen interval field may be a field indicating information related to a period (time) in which at least one STA switches to a wake state so that the non-AP STA MLD for performing multi-link (re)association receives the beacon frame. In this case, the listen interval field may indicate a value derived when a ListenInterval parameter is indicated in the MLME primitive.

In this case, when transmitting a listen interval field to an AP MLD (for example, an STR AP MLD) other than the NSTR AP NLD, the non-AP STA MLD may need to configure a unit of the listen interval field by using the largest value among beacon intervals of the links (of the AP) for which the non-AP STA MLD itself is to perform setup. For example, when the non-AP STA MLD is to perform multi-link setup of Link 1 or Link 2 with the AP MLD, the non-AP STA MLD may use, as a unit of a listen interval field included in the ML association request frame, a large value a beacon interval of Link 1 (of the AP) and a beacon interval of Link 2. That is, when the beacon interval of Link 1 is 100 ms and the beacon interval of Link 2 is 50 ms, the listen interval subfield unit transmitted by the non-AP STA MLD may be 100 ms.

In general, when the AP and the STA have completed the setup, the STA may receive a beacon frame transmitted by the AP and identify and track (update) a change in the operation parameter and element of the AP. In addition, the beacon frame also performs a role of providing information for adjusting time syncs of STAs within the BSS by including a timestamp field.

However, in a case of the NSTR AP MLD, as described above, no beacon frame is transmitted in the non-primary link, and thus the STA MLD having performed the setup with the NSTR AP MLD may need to perform a separate operation to perform parameter/element tracking (updating) and time sync maintenance for the non-primary link.

According to an embodiment of the present invention, a non-AP STA MLD having associated with an NSTR AP MLD may receive a beacon frame in a primary link, and then may identify a change sequence (in an MLD parameter field of an RNR element) of a non-primary link and transmit an ML probe request. In this case, the ML probe request frame transmitted by the non-AP STA MLD may be transmitted for the purpose of requesting changed parameter and element information of the non-primary link. In this case, the ML probe request frame may correspond to requesting complete information of the non-primary link while configuring a complete profile of a per-STA profile corresponding to the non-primary link (and the AP of the non-primary link) as 1 and transmitting the same. Alternatively, the ML probe request frame transmitted for the purpose of updating a parameter/element of the non-primary link by the STA MLD may correspond to a request for updated information rather than complete/partial information for the non-primary link.

In other words, even when multiple links are established between the non-AP STA MLD and the AP MLD, a frame for performing an association, re-association, or a parameter updating procedure may be performed only through the primary link. For example, when an STA has recognized that a parameter for the AP of the non-primary is updated, through a specific field (for example, a change sequence or a BSS parameter change count subfield (BSS parameter change count subfield, etc.)) indicating whether a parameter for another AP included in neighbor AP information included in the beacon frame is updated, the non-AP STA MLD may request transmission of the updated parameter through the primary link rather than the non-primary link of another AP. That is, the non-AP MLD cannot transmit a frame (for example, a probe request frame, etc.) for requesting an updated parameter through the non-primary link.

For example, after performing setup with the NSTR AP MLD, the non-AP STA MLD for requesting information for updating the parameter/element of the non-primary link may request an updated parameter/element for the AP of the non-primary link by configuring an updated profile subfield of the per-STA profile corresponding to the non-primary link as 1 in an ML probe request frame transmitted through the primary link. The NSTR AP MLD may respond with an ML probe response frame including changed information (parameter and element) of the non-primary link when the updated profile subfield is indicated as 1 in the per-STA profile (corresponding to the non-primary link) of the received ML probe request frame.

In this case, the per-STA profile field of the ML probe request frame transmitted by the non-AP STA MLD may include an updated profile subfield and a recorded change sequence subfield. The recorded change sequence subfield may indicate an up-to-date change sequence value maintained for the non-primary link by the non-AP STA MLD, and the AP MLD may identify/determine the type of updated information on the basis of a value indicated through the recorded change sequence subfield.

For example, the NSTR AP MLD may have changed parameter 1 by increasing a change sequence number of the non-primary link from 100 to 101, and have changed parameter 2 by increasing the change sequence number again from 101 to 102. In this case, the STA MLD may request updated information of the non-primary link while transmitting the ML probe request frame. In this case, when the non-AP STA MLD indicates the recorded change sequence subfield as 100, the NSTR AP MLD may respond with an ML probe response frame including both parameter 1 and parameter 2, and when the non-AP STA MLD indicates the recorded change sequence subfield as 101, the NSTR AP MLD may respond with an ML probe response frame including parameter 2 only.

In this case, the non-AP STA MLD may indicate the complete profile subfield as 0 without utilizing a separate updated profile subfield to request the updated profile. That is, a method for requesting an updated profile by a non-AP STA MLD may be configuring a complete profile subfield as 0, and in this case, a separate updated profile subfield may not be included in a per-STA profile.

FIG. 14 illustrates an example of a per-STA profile subelement format according to an embodiment of the present invention.

Referring to FIG. 14(a), a per-STA profile subelement may include an STA control field. The STA control field (see FIG. 14(b)) indicates information for indicating the type of a field included in an STA profile (see FIG. 14(a)) of the corresponding per-STA profile subelement. In this case, when a complete profile subfield of an STA control field of a specific per-STA profile subelement transmitted by an AP MLD other than an NSTR AP MLD is indicated as 1, all of a MAC address present subfield, a beacon interval present subfield, and a DTIM information present subfield may need to be indicated as 1. However, as described above, the NSTR AP MLD does not transmit a beacon frame in a non-primary link, and thus information related to the beacon frame of the non-primary link may not be indicated in the per-STA profile subelement corresponding to the non-primary link. That is, even though a complete profile subfield of a specific per-STA profile subelement (corresponding to an AP of the non-primary link) transmitted by the NSTR AP MLD is indicated as 1, a beacon interval present subfield and a DTIM information present subfield may be indicated as 0.

In addition, as described in an embodiment above, a non-AP STA MLD for transmitting an ML probe request frame to an NSTR AP MLD may indicate an updated profile subfield of an STA control field (included in a per-STA profile subelement corresponding to an AP of a non-primary link) as 1 to request changed information (updated information) of the non-primary link AP from the AP of the primary link. In this case, the non-AP STA MLD may indicate, using a recorded change sequence subfield (see FIG. 14(c)), a recorded change sequence value corresponding to information related to a time point at which the non-AP STA MLD itself updates the information of the non-primary link AP. In this case, the recorded change sequence subfield may be a subfield included in an STA profile. The NSTR AP MLD may receive the ML probe request frame of the non-AP STA MLD, received through the primary link, and then compare a value of the recorded change sequence subfield included in the ML probe request frame with a change sequence value of a current non-primary link AP, thereby determining non-primary link AP information to be sent as a response to the non-AP STA MLD.

Figure 15:
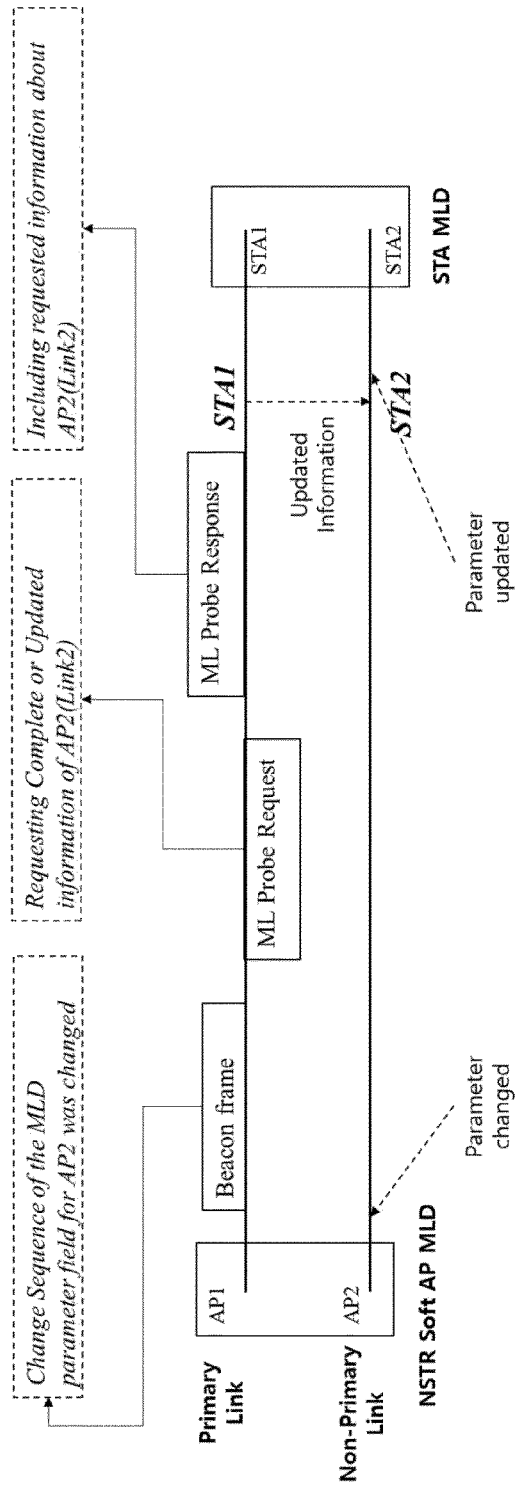
FIG. 15 illustrates an example of a process of updating information of a non-primary link by a non-AP MLD having performed setup with a non-simultaneous transmission and reception (NSTR) soft AP MLD according to an embodiment of the present invention.

FIG. 15 illustrates an example of a process of updating information of a non-primary link by a non-AP MLD having performed setup with a non-simultaneous transmission and reception (NSTR) soft AP MLD according to an embodiment of the present invention.

Referring to FIG. 15, an NSTR AP MLD may change a parameter of AP 2 operating in Link 2 corresponding to a non-primary link, and then indicate that the change of the parameter of AP 2 through a beacon frame transmitted by AP 1 operating in Link 1 corresponding to a primary link. In this case, the information on the change of the parameter of AP 2 may be indicated through an increase, by 1 compared to a value indicated by an immediately preceding beacon frame, in a change sequence subfield value corresponding to AP 2 in an RNR element included in a beacon frame transmitted by AP 1.

After receiving, through STA 1, the beacon frame transmitted by AP 1, the non-AP STA MLD may recognize the fact that the parameter of AP 2 has been updated. To acquire changed parameter information of AP 2, the non-AP STA MLD may transmit an ML probe request frame through STA 1.

The ML probe request frame transmitted through STA 1 by the non-AP STA MLD may include, in an ML element, a per-STA profile subelement corresponding to AP 2, and the per-STA profile subelement may include an indicator for indicating whether a complete profile is requested or an updated profile is requested.

After receiving the ML probe request frame from STA 1 through the primary link, the NSTR AP MLD may respond to STA 1 by including the requested AP 2 information (complete or updated information) in an ML probe response frame.

The non-AP STA MLD having received the AP 2 information requested by the non-AP STA MLD itself from the NSTR AP MLD through the ML probe response frame may update the parameter for AP 2 to complete parameter updating for the non-primary link in which the beacon frame is not transmitted.

Broadcast ML Probe Response

According to an embodiment of the present invention, an NSTR AP MLD may transmit a broadcast ML probe response frame through a primary link when information related to an AP operated in a non-primary link is changed. After receiving the broadcast ML probe response frame transmitted by the NSTR AP MLD through the primary link, the non-AP STA MLD may need to update information on the non-primary link (of an AP). In this case, the broadcast ML probe response frame may be an ML probe request frame transmitted by the NSTR AP MLD without a separate request, rather than transmitted as a response to an ML probe request frame transmitted by a specific STA.

The broadcast ML probe response frame takes a role of assisting non-AP STA MLDs in updating changed parameters and elements of the non-primary link, including the per-STA profile subelement corresponding to the AP of the non-primary link. In this case, (recorded) change sequences of the non-primary link maintained by the respective non-AP STAs may be different from each other, and thus the broadcast ML probe response frame may include complete information for the AP of the non-primary link. In this case, the broadcast ML probe response frame may be transmitted together with a DTIM beacon frame.

Accordingly, when a change sequence number corresponding to the AP of the non-primary link is different from the (recorded) change sequence maintained by the non-AP STA MLDs themselves, the non-AP STA MLDs may need to receive the next DTIM frame through the beacon frame and the broadcast ML probe response frame.

In this case, a procedure of updating the parameter of the non-primary link using the above-described broadcast ML probe response frame may need to be performed using a broadcast ML association response frame. In this case, a detailed description of a method for setting up a per-STA profile subelement of the broadcast ML association response frame and a procedure of updating a reception STA MLD is omitted since the description is identical to that of the above-described embodiment of the broadcast ML probe response frame.

Figure 16:
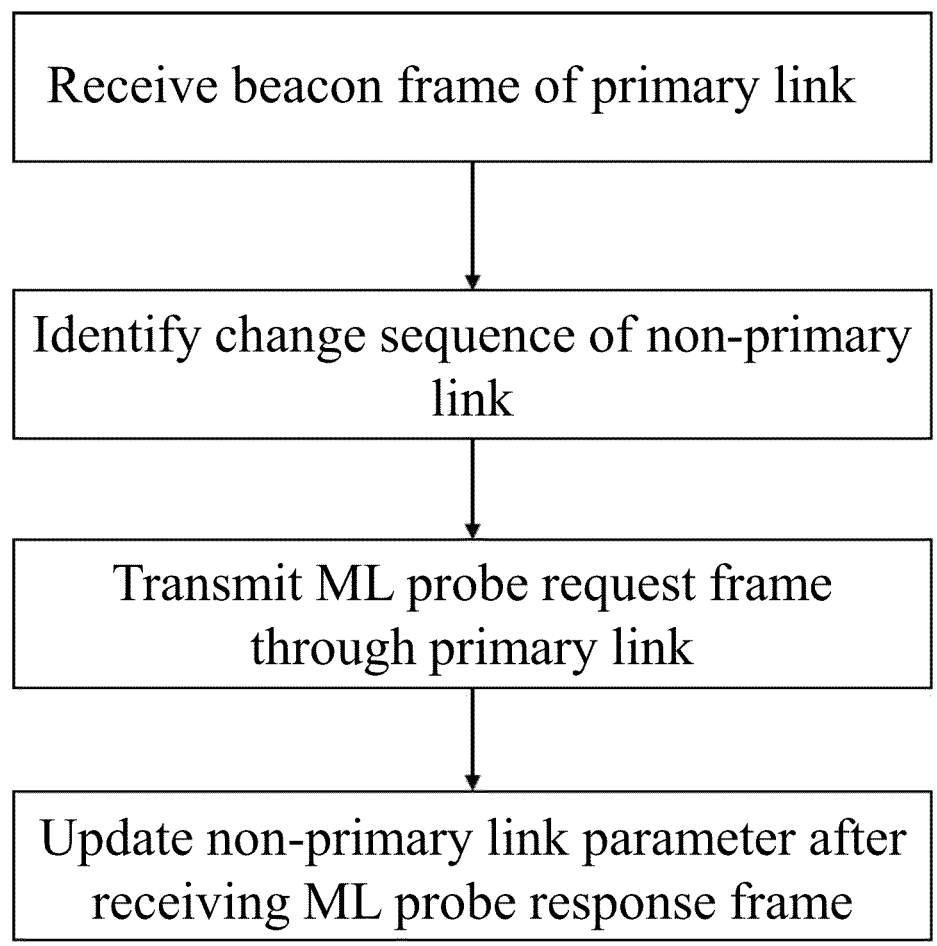
FIG. 16 is a flow chart illustrating an example of a procedure of updating a parameter of a non-primary link by a non-AP STA MLD associated with an NSTR AP MLD according to an embodiment of the present invention.

FIG. 16 is a flow chart illustrating an example of a procedure of updating a parameter of a non-primary link by a non-AP STA MLD associated with an NSTR AP MLD according to an embodiment of the present invention.

A non-AP STA MLD receives a beacon frame identifies a change sequence (in an MLD parameter field of an RNR element) of a non-primary link after receiving a beacon frame in a primary link. If the identified change sequence value of the non-primary link is different from a (recorded) change sequence value maintained by the non-AP STA MLD itself, the non-AP STA MLD may transmit an ML probe request frame through the primary link. In this case, the ML probe request frame may include a subfield indicating whether complete information or updated information for the non-primary link AP is requested. In addition, the ML probe request frame requesting updated information may be configured to also include a subfield indicating a (recorded) change sequence value maintained by the non-AP STA MLD itself. Thereafter, the non-AP STA MLD having received an ML probe response frame from the AP MLD performs parameter updating on the basis of information on the non-primary link AP, included in the ML probe response frame received as a response.

Time Sync Management of Non-Primary Link

As described above, a beacon frame transmitted by an AP takes a role of transferring information on various types of parameters and elements, and assisting STAs in the BSS in adjusting time syncs. A TimeStamp field included in the beacon frame may indicate a timing synchronization function (TSF) timer value at a time point at which a data symbol including a first bit of the TimeStamp field is shown on a transmission antenna connector, and an STA having received the TimeStamp field may synchronize its own TSF timer with the AP on the basis of the received TimeStamp field value.

As such, the AP and the STA may operate while maintaining the time sync on the basis of the TimeStamp value included in the beacon frame, and may perform a timing-based operation. However, the NSTR AP MLD cannot transmit the beacon frame through a non-primary link, and accordingly, an STA associated with a non-primary link AP of the NSTR AP MLD among STAs of the non-AP STA MLD needs to use a method other than the beacon frame in order to maintain the time sync with the AP.

To maintain the time sync with the non-primary link AP of the NSTR AP MLD, the associated non-AP STA may need to you TimeStmap of a TIM frame transmitted by the AP. The TIM frame includes a TimeStamp field having the same function as the beacon frame, and thus an STA having received the TIM frame from the non-primary link of the NSTR AP MLD may need to manage a TFS timer by using the TimeStamp field included in the TIM frame. However, in a case of the NSTR AP MLD, initiating transmission in the non-primary link without occupying the primary link may be restricted, and thus when the beacon frame is transmitted in the primary link, the TIM frame may need to be simultaneously transmitted in the non-primary link. That is, the non-AP STA MLD associated with the NSTR AP MLD may need to prepare to receive the TIM frame in the non-primary link in accordance with a TBTT of the primary link.

In another embodiment of the present invention, when the AP MLD corresponds to an NSTR AP MLD not supporting simultaneous transmission or reception, the same TSF time may be used in the respective links for multiple APs included in the NSTR AP MLD, and the TSF timer used in this case may be a TSF timer of the primary link. That is, when the AP MLD is the NSTR AP MLD, links (non-primary links) for the APs affiliated with the NSTR AP MLD may use the TSF timer of the primary link.

That is, the non-AP STA MLD associated with the NSTR soft AP MLD may need to use the TSF timer of the primary link in common with the non-primary link. In other words, the non-AP STA MLD associated with the NSTR AP MLD may use the TSF timer managed using the primary link, without having a separate TSF time for the non-primary liked (based on the NSTR soft AP MLD). That is, in an aspect of the present invention, the NSTR AP MLD and the non-AP STA MLD associated with the NSTR AP MLD may use an MLD level (MLD unit, MLD common) timer. In this case, for a stable operation of the NSTR AP MLD and the non-AP STA MLD associated with the NSTR AP MLD, it may be required to maintain that time synchronization between the respective APs of the NSTR AP MLD and/or the respective STAs of the non-AP STA MLD associated with the NSTR AP has an error equal to or less than a pre-promised value. For example, it may be required for the NSTR AP MLD to maintain that a TimeStamp difference (or a difference between timers) maintained between the AP of the primary link and the AP of the non-primary link is equal to or less than a pre-promised/configured value. For example, it may be required for the NSTR soft AP MLD to maintain that a TimeStamp difference maintained between the AP of the primary link and the AP of the non-primary link is equal to or less than a pre-promised/configured value.

In other words, the TSF timer of the primary link may be maintained (or applied or used) the same in links for all of the APs affiliated with or included in the NSTR AP MLD. In addition, a difference between TSF timers or timestamps or two APs among APs affiliated with or included in the NSTR AP MLD may be restricted to be within a specific value (for example, 30 us).

That is, TSF timers of all of the APs affiliated with or included in the NSTR AP MLD may be identical, and a clock drift or a difference between TSF timers or timestamps between two APs (for example, the AP of the primary link and the AP of the non-primary link) affiliated with or included in the AP MLD or the NSTR AP MLD may be restricted to be within a specific value (for example, +30 us), and in this case, the AP MLD or the NSTR AP MLD may amend the TSF timer or the timestamp so that the clock drift or the difference between the TSF timers is within the specific valuc.

In addition, when receiving the TIM frame through the non-primary link, the non-AP STA MLD associated with the NSTR AP MLD may need to receive a next beacon frame transmitted in the primary link. More specifically, when the non-AP STA MLD has received the TIM frame through the STA of the non-primary link and a value indicated by a check beacon field in a TIM frame action field is different from a check beacon value maintained by the non-AP STA MLD itself, the non-AP STA MLD may need to receive a next beacon frame transmitted in the primary link. In this case, the next beacon frame may mean a beacon frame transmitted to correspond to a TBTT of the primary link existing after a time point of receiving a TIM frame in the non-primary link. In this case, when the next beacon frame is received, it may mean that updating a parameter of the non-primary link through a per-STA profile (corresponding to the AP of the non-primary link) included in the beacon frame is accompanied (included). In this case, a parameter to be updated may be restricted to a parameter related to critical update.

Channel Switching and Channel Quicting Procedures of Non-Primary Link>

As described above, the NSTR AP MLD transmits no beacon frame in the non-primary link, and accordingly, a BSS operation performed on the basis of a transmission timing of the beacon frame may be performed in a difference manner from that of a BSS operation of a general AP MLD.

In the conventional Wi-Fi, a BSS operation channel frequency (operation frequency band) may be changed according to a procedure pre-promised between the AP and the STA. In this case, the conventional extended channel switching (ECS) operation may be utilized, and a channel switching mechanism newly defined in 11be may also be utilized. When the AP determines to change the BSS operation channel, the AP may transmit a beacon frame, a probe response fame, an extended channel switch announcement frame, etc., and notify of the same so that associated STAs can switch to a new channel or operating class while maintaining the association. In this case, the AP transmits the extended channel switch announcement element through the beacon frame, and a channel switch count field of the corresponding element indicates information on the number of times that the beacon frame will be transmitted before the channel switching (operation channel switching) is performed. If the AP includes, in the beacon frame, a MAX channel switch time element together with the extended channel switch announcement element, the AP may need to transmit the first beacon frame within a switch time field (of the max channel switch time element) in a new channel. That is, the beacon frame transmitted in the new channel needs to be transmitted while having a time interval from the last beacon frame transmitted in the current channel, the time interval shorter than a time interval indicated through the switch time field.

With reference to the above-described channel switching operation of the conventional Wi-Fi BSS, the AP of the BSS may indicate, to the STA through the beacon frame transmitted in the current channel, information on a new channel, information on a time point at which channel switching is performed, and information related to a time point at which the beacon frame first transmitted in the new channel. The STA of the BSS may move to a new channel within a determined time interval (a time interval indicated by the AP) on the basis of the channel switching-related information included in the beacon frame transmitted by the AP, and may thus complete the channel switching while maintaining the association with the AP. As such, the channel switching procedure of the conventional Wi-Fi BSS may be performed in a scheme in which information (a channel switch mode, a new operating class, a new channel number, a channel switch count, etc.) required for channel switching is provided through the beacon frame transmitted by the AP, and accordingly, the non-primary link BSS of the NSTR AP MLD transmitting no beacon frame cannot perform channel switching using the conventional channel switching procedure.

In addition, when the conventional Wi-Fi configures a quiet interval, information on a time interval to which a quite interval is applied is indicated through elements (a quiet element, a quiet channel element, etc.) included in the beacon frame transmitted by the AP of the BSS, and similar to the channel switching procedure, the non-primary link of the NSTR AP MLD transmitting no beacon frame cannot use the conventional quieting procedure for configuring the quiet interval.

According to an embodiment of the present invention, the NSTR AP MLD may indicate, through the beacon frame transmitted in the primary link, information required to switch an operating channel of the non-primary link (information required to perform channel switching) and/or information required to configure a quiet interval. That is, the non-AP STA MLDs associated with the NSTR AP MLD may operate on the basis of the information acquired through the beacon frame of the primary link to perform channel switching of the non-primary link. That is, the non-AP STA MLDs associated with the NSTR AP MLD may acquire information related to the quiet interval of the non-primary link through the beacon frame of the primary link.

That is, in a case of an STR AP MLD, APs included in the same AP MLD may periodically transmit the beacon frame. In this case, each of the APs may include, in the beacon frame transmitted by itself, basic information of another AP, and the basic information of another AP may include information (for example, a channel switch announcement element, an extended channel switch announcement element, a max channel switch element) related to a channel change of another AP, and/or information for configuring a quiet interval.

In this case, the channel switch announcement element and the extended channel switch announcement element may include a new channel number field indicating a switched channel number and a channel switch count field.

The channel switch count field indicates the number of TBTTs until an STA having transmitted the channel switch count field switches to a new channel. When a value of the channel switch count field is configured to be "1", the channel switching may occur in the next TBTT, and when a value of the channel switch count field is configured to be "0", the channel switching may occur any time after the channel switch count field is transmitted.

The channel switch announcement element and the extended channel switch announcement element may be included in the channel switch announcement frame, the beacon frame, and the probe response frame and transmitted.

If switching is performed to an operating class, the station may further include, in the extended channel switch announcement element, a new operating class indicating a switched operating class, and transmit the same.

The max channel switch time element may indicate an interval in which the beacon can be transmitted in the switched channel from a time point at which the channel switching is started. For example, when the channel switching is successfully performed, the station (for example, the AP STA) having performed the channel switching may transmit the beacon in a new switched channel within an interval between a time point at which the channel switching is started and a time point indicated by the max channel switch time element.

In this case, the max channel switch time element may include a switch time field indicating an interval for transmission of the beacon in the new channel.

The channel switch information for channel switching of other APs included in the same AP MLD may be transmitted by respective APs on assumption that the APs included in the same AP MLD periodically transmits the beacons. However, the APs included in the same AP MLD as the APs supporting NSTR may transmit the beacon frames only through the primary link. That is, only a specific AP among the multiple APs included in the same AP MLD may transmit the beacon through the primary link, and the other APs cannot transmit the beacon. Accordingly, in this case, even though the APs for the non-primary link transmit no beacon, the AP of the primary link may include, in the beacon frame, channel switch information of APs for the non-primary link, and transmit the same.

More specifically, when performing channel switching of the non-primary link or configuring a quiet interval, the NSTR AP MLD may need to include, in the beacon frame (and the (ML) probe response frame) of the primary link, a per-STA profile for the AP of the non-primary link.

FIG. 17 illustrates an example of formats of elements according to an embodiment of the present invention. FIG. 17 illustrates an example of a format of each element described above.

Referring to FIG. 17, a per-STA profile for (corresponding to) an AP of a non-primary link may include a channel switch announcement element, an extended channel switch announcement element, a max channel switch time element, a quiet element, and a quiet channel element.

Timing fields of the elements may need to be configured with reference to a beacon interval and a target beacon transmission time (TBTT) of a primary link going details are provided for the convenience of understanding of the disclosure, and the disclosure is not limited thereto.

Specifically, when APs included in the normal AP MLD include channel switch information for other APs in the frame and transmit the same, a channel switch element (for example, a channel switch announcement element, an extended channel switch announcement element, a max channel switch time element, a quiet element, a quiet channel element, etc.) for other APs may be configured with reference to an AP for performing channel switching rather than an AP for transmitting channel switch information and transmitted.

However, in a case of an AP MLD (NSTR AP MLD) supporting NSTR, since only an AP for a primary link transmits a beacon frame and an AP for a non-primary link does not transmit a beacon frame, channel switch information of the AP of the non-primary link and/or information on a quiet interval may be configured with reference to the AP of the primary link rather than the AP of the non-primary link.

Specifically, APs constituting the AP MLD may transmit a per-STA profile including channel switch information for APs of the non-primary link and/or information related to a quiet interval through a specific frame (for example, beacon frame) in the primary link. In this case, the channel switch information for APs of the non-primary link and/or information related to the quiet interval may be configured with reference to the AP of the primary link.

For example, timing fields (for example, duration-related fields (switch time, quiet duration field, etc.) and time-related fields including time point-related fields (channel switch count, quiet count field, etc.), etc.) included in the channel switch announcement element, the extended channel switch announcement element, the quiet element, and/or the quiet channel element needs to be applied with reference to the most recent TBTT and BI indicated in the corresponding element of the AP operating the primary link.

A primary link AP of an NSTR AP MLD may need to configure timing fields of the channel switch announcement element, the extended channel switch announcement element, the max channel switch time element, the quiet element, and the quiet channel element included in the per-STA profile (included in a beacon frame and a (ML) probe response frame) for the AP of the non-primary link with reference to the beacon interval and the TBTT of the primary link AP itself. In this case, the timing fields are utilized to collectively indicate time-related fields including duration-related fields (switch time field, quiet duration field, etc.) and time point-related fields (channel switch count field, quiet count field, etc.).

Accordingly, non-AP MLDs combined with the NSTR AP MLD may receive a beacon frame from the AP of the NSTR AP MLD operated in the primary link, and then acquire information related to a quiet interval and/or channel switching of the non-primary link from a per-STA profile included in the beacon frame, and may need to interpret the information related to the quiet interval and/or the information related to channel switching of the non-primary link with reference to the TBTT and the beacon interval (BI) of the primary link. In this case, the per-STA profile means a per-STA profile corresponding to the AP of the non-primary link.

The NSTR AP MLD may need to transmit a TIM frame (of the non-primary link) in a new channel within a time indicated through a switch time field (of a max channel switch time element) after completing channel switching (after completing announcement and channel switching) of the non-primary link through the beacon frame of the primary link. That is, the non-primary link AP of the NSTR AP MLD may need to transmit a TIM frame in a new channel after performing channel switching. In this case, the non-primary link AP may need to transmit the TIM frame in the new channel within the time indicated through the switch time field after the beacon frame having indicated the channel switch count subfield as 1 (or 0) is transmitted in the primary link. In this case, the channel switch count field and the switch time field may be included in the per-STA profile (corresponding to the non-primary AP) included in the beacon frame transmitted in the primary link. In this case, the TIM frame may be substituted by another frame transmitted in the new channel of the primary link or the non-primary link. For example, the NSTR AP MLD may transmit a beacon frame indicating information related to completion of channel switching in the primary link after completing channel switching of the non-primary link. In this case, the beacon frame may be an additional beacon frame transmitted regardless of the TBTT. In this case, the beacon frame may be a beacon frame having a configuration including complete information for the non-primary link. For example, the beacon frame having a configuration including the complete information for the non-primary link may be a beacon frame having a complete information subfield of the per-STA profile corresponding to the AP of the non-primary link as 1. In this case, the beacon frame of the primary link transmitted after termination of channel switching of the non-primary link and the beacon frame transmitted before the channel switching starts may need to be transmitted within a pre-promised time. In this case, the pre-promised time may be a time indicated through a switch time field (of the max channel switch time element). Alternatively, the beacon frame may be a beacon frame including indication related to channel switching of the non-primary link. For example, the beacon frame of the primary link, transmitted after completion of the channel switching in the non-primary link may include a channel switch complete subfield. In this case, the channel switch complete subfield may be a subfield included in the ML element. A specific switch complete subfield may be a subfield indicated by 1 when channel switching of the AP corresponding to the per-STA profile including the specific subfield is completed. That is, the AP may need to configure the channel switch complete subfield of the per-STA profile (of the beacon frame) corresponding to the AP of the non-primary link as 1 after completing the channel switching in the non-primary link. In this case, the beacon frame related to the channel switching may be also transmitted (utilized) for the same purpose in a case where the AP MLD is not the NSTR AP MLD, that is, by a general AP MLD.

Only in a case where the non-AP MLD associated with the NSTR AP MLD performs channel switching of the non-primary link through the primary link and then receives a frame (a TIM frame or another frame of the non-primary link and/or a beacon frame indicating information related to channel switching completion of the primary link) promised from the AP MLD, the non-AP MLD may perform an operation in consideration that the channel switching of the non-primary link has been completed. That is, information (for example, channel switch information, etc.) on the channel switching of the AP of the non-primary link, the AP being included in the AP MLD supporting NSTR, may be transmitted through the AP of the primary link. In this case, the AP of the non-primary link is not the primary link even after the completion of the channel switching, and thus the beacon frame cannot be transmitted in the switched channel. Accordingly, in this case, if the channel switching is completed, the AP of the non-primary link may indicate to the station of the non-AP MLD that the channel switching has been completed by transmitting a TIM frame indicating that the channel switching has been completed. Alternatively, the AP of the primary link may indicate to the station of the non-AP MLD that the channel switching has been completed by transmitting a beacon frame indicating that the channel switching for the AP of the non-primary link has been completed.

If it is considered that the channel switching has not been completed, the non-AP STA MLD may need to consider that the channel switching of the non-primary link has been cancelled and operate (return to the previous channel) in the previous channel (a channel before channel switching is performed).

In another method, the NSTR soft AP MLD may configure, to be a specific value, a specific subfield of a beacon frame transmitted in the primary link while the non-primary link AP (the BSS of the AP) performs channel switching. More specifically, the beacon frame transmitted through the primary link by the NSTR soft AP MLD may include a subfield which is maintained to be 1 or 0 while the AP of the non-primary link performs channel switching and is indicated to be 0 or 1 during a time interval in which the AP of the non-primary link does not perform channel switching. That is, the NSTR soft AP MLD may need to configure the subfield on the basis of whether or not the AP of the non-primary link is performing channel switching. In this case, the subfield may be a subfield included in a per-STA profile or an RNR element corresponding to the AP of the non-primary link.

As described above, if the NSTR soft AP MLD determines a value of the subfield on the basis of whether or not the AP of the non-primary link is performing channel switching, the non-AP MLD associated with the NSTR soft AP MLD may determine whether channel switching of a non-primary link AP (BSS) is performing on the basis of a value of the subfield indicated through the beacon frame received in the primary link. That is, the non-AP MLD may recognize that the AP of the non-primary link is performing channel switching by identifying that the subfield corresponding to the AP of the non-primary link is indicated as a specific value (for example, 1) in the beacon frame received through the primary link. If the non-AP MLD identifies that the subfield corresponding to the AP of the non-primary link is not a specific value from the beacon frame received through the primary link, the non-AP MLD may recognize that the AP of the non-primary link has completed the scheduled channel switching. In this case, the meaning of the completion above may mean both completion of performing a channel switching operation indicated through the most recently received (extended) channel switching announcement element corresponding to the AP of the non-primary link and cancellation. If the subfield corresponding to the AP of the non-primary link is indicated as a value other than a specific value (a value other than a value indicated while the channel switching is performed), the non-AP MLD may consider that the AP of the non-primary link is operating in an operation channel/class indicated through the most recently received beacon frame (or probe response frame). When transmitting a UL PPDU through the non-primary link, the non-AP MLD may need to perform UL PPDU transmission on the basis of whether the AP of the non-primary link is operating in the channel (class) recognized by the AP itself. For example, the non-AP MLD may transmit the UL PPDU only when the subfield corresponding to the AP of the non-primary link is indicated to be a value other than a specific value. However, when the subfield corresponding to the AP of the non-primary link is indicated to be a specific value, the non-AP MLD may not need to transmit the UL PPDU in consideration that the AP of the non-primary link is performing channel switching.

In another method, the NSTR soft AP MLD may maintain a critical update flag of the beacon frame (or probe response frame) as 1 until the AP of the non-primary link (the BSS of the AP) completes channel switching. The NSTR soft AP MLD includes an (extended) channel switching announcement element corresponding to the AP of the non-primary link in the beacon frame, thereby assisting the non-AP MLDs in recognizing the scheduled channel switching of the non-primary link. In this case, when including the (extended) channel switching announcement element in the beacon frame (transmission through the primary link) and transmitting the same, the NSTR soft AP MLD needs to configure a critical update flag subfield of the beacon frame as 1. The NSTR soft AP MLD may allow the non-AP MLDs to recognize the fact that the channel switching of the non-primary link is continued to be performed by maintaining the value of the critical update flag subfield as 1 until the channel switching of the non-primary link is completed. In this case, the NSTR soft AP MLD may need to include the (extended) channel switching announcement element (corresponding to the AP of the non-primary link) in the beacon frame until the AP of the non-primary link completes channel switching. In this case, when the AP of the non-primary link is performing channel switching, the NSTR soft AP MLD may need to indicate a channel switch count subfield of a channel switch announcement element corresponding to the AP of the non-primary link to be 0. In this case, when the AP of the non-primary link is performing channel switching, the NSTR soft AP MLD may need to indicate a SwitchTime subfield of a channel switch timing element corresponding to the AP of the non-primary link as a time value up to a predicted channel switching completion time point. In this case, the NSTR soft AP MLD may configure the SwitchTime subfield to be a specific value (for example, 65535) not to specify a channel switching completion time point of the non-primary link AP.

As described above, if the NSTR soft AP MLD maintains the value of the critical update flag subfield as 1 while the AP of the non-primary link is performing channel switching, the non-AP MLDs may not transmit the UL PPDU in the non-primary link when the value of the critical update subfield is 1. More specifically, when the critical update flag subfield of the beacon (probe response) frame received from the NSTR soft AP MLD is 1 and the channel switch count subfield corresponding to the non-primary link AP is indicated to be 0, the non-AP MLDs may not transmit the UL PPDU in the non-primary link. More specifically, when the critical update flag subfield of the beacon (probe response) frame received from the NSTR soft AP MLD is indicated to be 1 and the SwitchTime subfield corresponding to the non-primary link AP is indicated to be a value other than 0, the non-AP MLDs may not transmit the UL PPDU in the non-primary link.

In another method, when the non-primary link AP (the BSS of the AP) has completed channel switching, the NSTR soft AP MLD may indicate a BSS parameters change count subfield value corresponding to the non-primary link AP by increasing the value by 1. In this case, the BSS parameters change count subfield means a BSS parameter change count subfield in an MLD parameter field of a TBTT information field corresponding to the AP of the non-primary link. A normal AP MLD increases the value of the BSS parameters change count subfield by 1 only when the parameter of the AP corresponding to the BSS parameters change count subfield is updated, but the NSTR soft AP MLD may also increase the value of the BSS parameters change count subfield corresponding to the AP of the non-primary link by 1 when channel switching is completed. This is a method for indicating that the channel switching operation indicated for the AP of the non-primary link has been completed, and may be understood that the value of the BSS parameters change count subfield is increased, and when channel switching of the non-primary link AP is scheduled/performed and the value of the BSS parameters change count subfield is increased by 1, the non-AP MLD may recognize that the channel switching that is scheduled/that is being performed has been completed. In this case, after recognizing that channel switching that is scheduled/that is being performed has been completed, the non-AP MLD may transmit the UL PPDU. The non-AP MLD operation relating to the UL PPDU transmission condition is identical to an example of the above-described other channel switching completion indication method, and is thus omitted.

In another method, when the non-primary link AP (the BSS of the AP) is scheduled to perform channel switching or is performing channel switching, the NSTR soft AP MLD may transmit a frame including a subfield indicating each different value in the primary link when the channel switching has been completed. In this case, the frame may be a beacon frame. To describe it in more detail, when channel switching for the non-primary link AP is scheduled, the NSTR soft AP MLD may indicate the (extended) channel switch announcement element corresponding to the non-primary link AP and indicate a specific subfield as a specific value (for example, 1). When channel switching of the non-primary link AP is initiated, the NSTR soft AP MLD may configure the specific subfield with a value (for example, 2) other than the specific value until channel switching is completed. When channel switching of the non-primary link AP is completed, the NSTR soft AP MLD may configure the specific subfield as an initial value (for example, 0). As such, the NSTR soft AP MLD configure values of the specific subfield corresponding to the non-primary link AP with different values for a case where channel switching is scheduled, a case where channel switching is being performed, and a case where channel switching is completed (channel switching is not scheduled) so as to allow associated non-AP MLDs to recognize a channel switching progress of the non-primary link. The non-AP MLD may identify the specific subfield included in the frame received in the primary link, thereby determining whether to transmit the UL PPDU in the non-primary link. For example, the non-AP MLD may transmit the UL PPDU only when the most recently received specific subfield has an initial value.

In another method, the non-AP MLD may determine whether the AP of the non-primary link has completed channel switching on the basis of a beacon frame of the primary link, received after a time point at which channel switching of the non-primary link AP indicated (announced) by the NSTR soft AP MLD is scheduled to be completed.

To describe it in more detail, the non-AP MLD may identify, with reference to a channel switching completion time point of the non-primary link AP identified through elements related to channel switching, operating channel/class information of the non-primary link AP, indicated by the beacon frame received in the primary link after the completion time point, thereby determining whether the scheduled channel switching is completed. In this case, a method for identifying the channel switching completion time point of the non-primary link AP through the elements related to the channel switching may be using a value indicated through the SwitchTime subfield of the channel switch timing element. When the non-AP MLD has identified, from the beacon frame received after the scheduled channel switching completion time point, that the same information as the operating channel/class in which channel switching is scheduled is indicated for the non-primary link AP, the non-AP MLD may determine that the AP of the non-primary link has completed the scheduled channel switching and transmit the UL PPDU. That is, when receiving the first beacon frame (through the primary link) after the scheduled channel switching completion time point of the non-primary link, the non-AP MLD may transmit the UL PPDU through the non-primary link. In this case, the channel/class in which the non-AP MLD transmits the UL PPDU may be an operating channel/class of the non-primary link AP, indicated through the first beacon frame.

In addition, the NSTR AP MLD may not perform channel switching of the non-primary link. However, when the NSTR AP MLD performs channel switching of the non-primary link, an operation such as releasing the AP of the non-primary link operated in the existing channel and adding a new non-primary link AP in a new channel may be performed.

In addition, as another embodiment of the present invention, it may be restricted so that the NSTR AP MLD cannot configure the quiet interval in the non-primary link. In this case, when there is a quiet interval defined (configured) in the primary link, the quiet interval of the non-primary link may be defined (configured) as the same time interval as the quiet interval of the primary link. That is, when the non-AP STA MLD associated with the NSTR AP MLD has recognized the quiet interval of the primary link, the non-AP STA MLD may consider that the quiet interval is also configured in the non-primary link for the same time interval.

As such, a quiet element for the non-primary link, transmitted through the beacon frame of the primary link, may be configured (indicated) by the NSTR AP MLD as follows.

1. A quiet count field may be configured with the number of remaining TBTTs of a primary link until the next quiet interval starts in a non-primary link.

2. A quiet period field may be configured with a value (a beacon interval unit of a primary link) related to the number of primary link beacon intervals at which a regular (periodic) quiet interval of a non-primary link, defined through a corresponding quiet element, starts (configured as 0 in a case of non-regular quiet interval).

3. A quiet offset field may be configured with a time value (in units of TUs) related to an offset that a quiet interval of a non-primary link has from a TBTT of a primary link specified through a quiet count subfield before the quite interval starts.

An (extended) channel switch announcement element and a max channel switch time element for the non-primary link transmitted through the beacon frame of the primary link may be configured (indicated) by the NSTR AP MLD as follows.

1. A channel switch count field of a channel switch announcement element may be configured with information related to the number of remaining TBTTs of a primary link before channel switching of a non-primary link starts. If channel switching of a non-primary link AP starts at a next TBTT of the primary link, a beacon frame transmitted at a current TBTT may have a channel switch count field (related to the non-primary link AP) configured as 1 or 0.

2. A switch time field of a max channel switch time element may be configured with a value for a maximum time difference between a primary beacon frame (a beacon frame having the channel switch count field configured 1 or 0 in number 1 above) transmitted at a TBTT immediately before a TBTT at which channel switching of a non-primary link starts and a TIM frame transmitted in a new channel of the non-primary link after the channel switching of the non-primary link is completed. For example, when a beacon interval of the primary link is 100 ms and the switch time field (for the non-primary link AP) is configured as 200 ms, an AP of the non-primary link may need to transmit a TIM frame in a new channel within 200 ms after a beacon frame transmission time point of the primary link in which the AP of the non-primary link itself has started channel switching.

Accordingly, after receiving the beacon frame through the primary link, the non-AP MLD associated with the NSTR AP MLD may acquire information relating to the quiet interval and channel switch time point and interval of the non-primary link on the basis of TBTT and beacon interval information of the primary link and information indicated in the per-STA profile of the non-primary AP included in the beacon frame. In this case, the non-AP MLD may configure (recognize or interpret) a start time point of the quiet interval of the non-primary link on the basis of the TBTT of the primary link. In this case, the non-AP MLD may recognize/interpret a channel switch time point of the non-primary link on the basis of a reception time of the beacon frame received in the primary link.

When an AP performs channel switching, the conventional Wi-Fi non-AP STA may select whether to perform channel switching together to maintain association with the AP. However, when the NSTR AP MLD performs channel switching in the non-primary link, the non-AP STA MLD associated with the NSTR AP MLD may need to mandatorily perform channel switching of the non-primary link.

If the non-AP STA MLD having performed an ML setup (that is, an ML setup using primary and non-primary links) with the NSTR AP MLD determines not to perform channel switching of the non-primary link, the non-AP STA MLD may need to terminate (release or change) the ML setup with the NSTR AP MLD, and switch to a state in which a setup is performed only through the primary link (through a setup after releasing or a re-setup).

That is, the station of the non-AP MLD, which has received channel switch information related to channel switching for the AP of the non-primary link from the AP of the primary link included the AP MLD supporting NSTR may determine whether to perform channel switching together with the AP of the non-primary link.

If the station associated with the AP of the non-primary link determines to perform channel switching, the station may move to the switched channel to receive a specific frame (for example, TIM frame) indicating that the AP of the non-primary link has completed channel switching, or receive a beacon frame indicating that the AP of the primary link has completed channel switching of the AP of the non-primary link. The non-AP STA having received the TIM frame or the beacon frame may recognize that the channel switching has been completed, and may transmit or receive the frame in the switched channel.

However, if the station associated with the AP of the non-primary link determines not to perform channel switching, the non-AP STA not performing channel switching may terminate (release or change) multi-link setup with the AP of the non-primary link. In this case, since the link setup between the AP of the non-primary link and the non-AP STA is released, and thus there is only a single link setup of the primary link between the AP MLD and the STA MLD.

If the non-AP STA having link setup with the AP of the primary link does not performs channel switching for the AP of the primary link, the non-AP STA may select whether to move to another BSS and perform link setup with an AP of another BSS.

The NSTR soft AP MLD may need to configure a time interval in which channel switching is performed in the primary link with a quiet interval of a non-primary link BSS. This may be an operation based on the restriction that the non-primary link may be occupied only when the NSTR soft AP MLD and the non-AP STAs associated with the NSTR soft AP MLD occupy the primary link. If the NSTR soft AP MLD performs channel switching for the AP (BSS) of the primary link, the NSTR soft AP MLD and the associated non-AP MLD are restricted to perform communication not only in the primary link but also in the non-primary link. Accordingly, if the NSTR soft AP MLD performs channel switching for the AP (BSS) of the primary link, the same time interval as the channel switching interval may need to be indicated as a quiet interval of the non-primary link AP (BSS). Alternatively, even though the NSTR soft AP MLD does not separately indicate the quiet interval of the non-primary link, the non-AP MLDs associated with the NSTR soft AP MLD should not transmit the UL PPDU in the non-primary link until a channel switching completion time point arrives (until the first beacon frame is received in a new channel of the primary link) from a start time point of channel switching of the primary link. In this case, the non-AP MLD may perform an operation of generating a new backoff counter when a backoff counter is 0 during a time interval in which the UL PPDU is not transmitted in the non-primary link. In this case, the new backoff counter may be a backoff counter generated using a current contention window (CW). In this case, a counter (short retry count, long retry counter, etc.) related to retransmission is not changed.

Similarly, the NSTR soft AP MLD may need to configure the quiet interval of the BSS of the non-primary link BSS with the time interval configured as the quiet interval of the primary link BSs. This may be an operation based on the restriction that the non-primary link may be occupied only when the NSTR soft AP MLD and the non-AP STAs associated with the NSTR soft AP MLD occupy the primary link. If the NSTR soft AP MLD configures a quiet interval for the AP (BSS) of the primary link, the NSTR soft AP MLD and the associated non-AP MLD are restricted to perform communication not only in the primary link but also in the non-primary link. Accordingly, if the NSTR soft AP MLD indicates (configures) the quiet interval for for the AP (BSS) of the primary link, the same time interval as the channel switching interval may need to be indicated (configured) as a quiet interval of the non-primary link AP (BSS).

As such, when channel switching is being performed in the primary link or when the quiet interval of the primary link is configured, the non-AP MLDs associated with the NSTR soft AP MLD may not transmit the UL PPDU through the non-primary link. Accordingly, when channel switching of the primary link is being performed or when the quiet interval is in progress, the non-AP MLDs may perform a power save operation for the non-aP STA operated in the non-primary link. This may be a power save operation using the fact that DL PPDU transmission from the AP of the non-primary link may not be performed for the non-AP STA operated in the non-primary link when channel switching is being performed in the primary link or the quiet interval is in progress. In addition, even though the non-AP STA operated in the non-primary link completes a channel access operation (for example, a backoff operation of EDCA), UL PPDU transmission using the non-primary link is restricted, and thus the non-AP MLD may determine to suspend a channel access operation performed in the non-primary link. For example, the non-AP MLD may suspend a channel access operation and/or a CCA operation of the non-AP STA operated in the non-primary link when channel switching or a quite interval is in progress (is being performed) in the primary link. In this case, suspending the channel access operation and/or CCA operation may mean operating in a doze state of a power save mode.

In consideration that the STAs of the non-AP MLD perform a power save operation (specifically, maintain a doze state) for the non-AP STAs operated in the non-primary link, the NSTR soft AP MLD may transmit an assistance frame in the non-primary link when channel switching/quiet interval is terminated (completed). In this case, the assistance frame may be transmitted so that the non-AP STAs of the non-primary link derive (assist) releasing (reset) of an NAVSyncDelay timer which starts after switching to an awake state. The assistance frame may be transmitted at a basic rate. In this case, the assistance frame may be a frame simultaneously transmitted when the beacon frame of the primary link is transmitted. In this case, the NAVSyncDelay timer may mean a timer related to time for the STA having switched from the doze state to the awake state to perform CCA for NAV setup.

Figure 18:
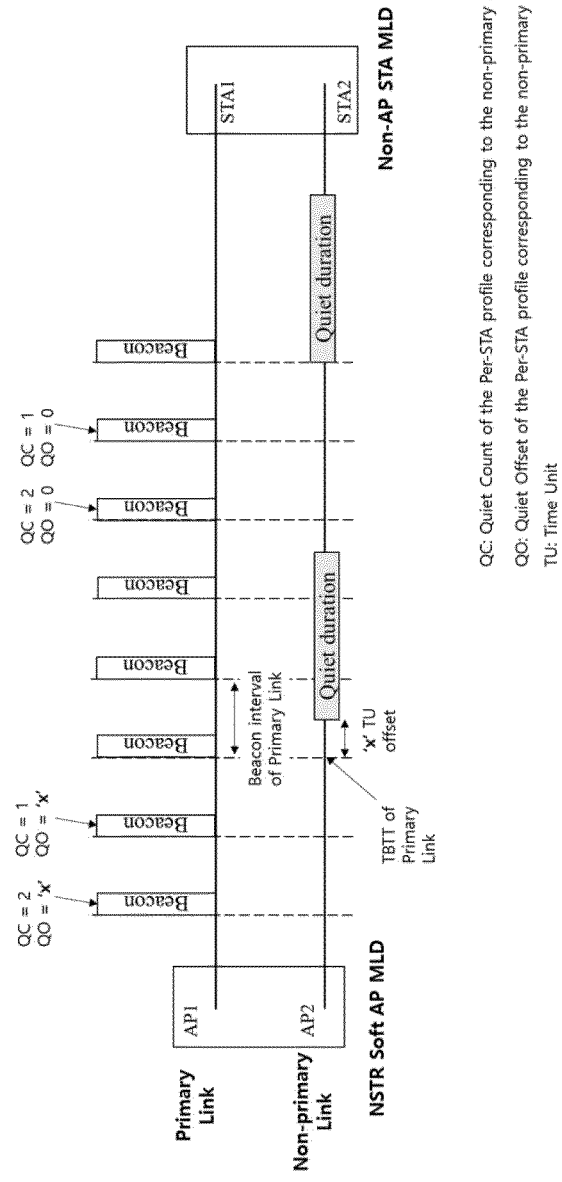
FIG. 18 illustrates an example of a process of configuring (defining) a quiet interval in a non-primary link by an NSTR AP MLD according to an embodiment of the present invention.

FIG. 18 illustrates an example of a process of configuring (defining) a quiet interval in a non-primary link by an NSTR soft AP MLD according to an embodiment of the present invention.

Referring to FIG. 18, the NSTR AP MLD operates AP 1 and AP 2 in a primary link and a non-primary link, respectively, and is combined with each of STA 1 and STA 2 of a non-AP STA MLD.

The NSTR AP MLD may include a per-STA profile corresponding to AP 2 in a beacon frame transmitted through AP 1 of the primary link and transmit the same in order to configure (define) a quiet interval (quiet interval #1 of FIG. 18) in the non-primary link. The per-STA profile corresponding to AP 2 includes a quiet element, and indicates information related to a time point at which the quiet interval (quict interval #1 of FIG. 18) starts, through quiet count and quiet offset fields. When the quiet element is included in a first beacon frame (beacon #1 of FIG. 18) of the primary link illustrated in FIG. 18, a quiet count field is configured with a value indicating 2, a quiet offset field is configured with a value indicating "x" time units (TUs, 1024 us), and a quiet count field is configured with 1 in a second beacon frame (beacon #2 of FIG. 18).

The non-AP STA MLD having received the first and/or the second beacon frame through the primary link may identify the quiet element included in the per-STA profile (corresponding to AP 2) of the beacon frame, and may recognize that a quict interval is configured (announced by the AP MLD) in the non-primary link and the quiet interval (quiet interval #1 of FIG. 18) starts from a time point after "x" TUs from a TBTT corresponding to a third beacon frame.

As illustrated in FIG. 18, the NSTR AP MLD may include the per-STA profile corresponding to AP 2 in the beacon frame transmitted through AP 1 of the primary link and transmit the same again in order to additionally configure (define) the next quiet interval (quiet interval #2 of FIG. 18) in the non-primary link. In a sixth beacon frame (beacon #6 of FIG. 18) of the primary link illustrated in FIG. 18, a quict count field is configured with a value indicating 2, a quiet offset field is configured with a value indicating 0 time unit (TU, 1024 us), and in a seventh beacon frame (beacon #7 of FIG. 18), a quiet count field is configured with 1.

The non-AP STA MLD having received the sixth and/or seventh beacon frame through the primary link may identify the quiet element included in the per-STA profile (corresponding to AP 2) of the beacon frame, thereby recognizing that a quiet interval (quiet interval #2) is configured (announced by the AP MLD) in the non-primary link and the quiet interval (quict interval #2) starts from a TBTT corresponding to an eighth beacon frame.

In this case, information on the lengths of the quiet intervals is indicated through a quiet duration field indicated together in the quiet element.

Figure 19:
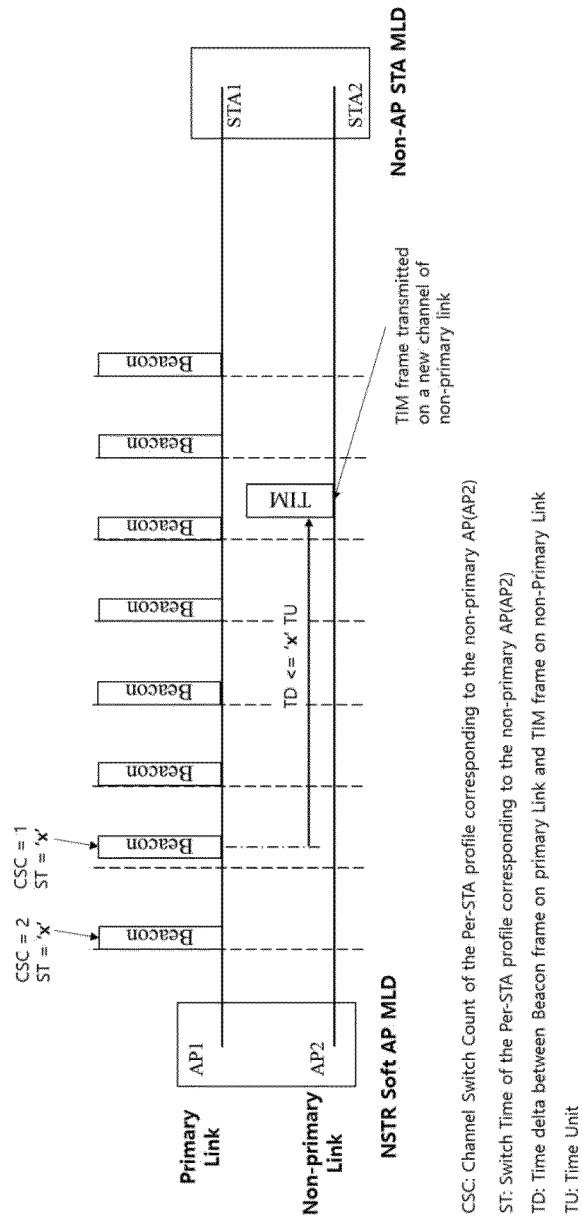
FIG. 19 illustrates an example of a method of performing non-primary channel switching by an NSTR AP MLD according to an embodiment of the present invention.

FIG. 19 illustrates an example of a method of performing non-primary channel switching by an NSTR soft AP MLD according to an embodiment of the present invention.

Referring to FIG. 19, an NSTR AP MLD may operate AP 1 and AP 2 in a primary link and a non-primary link, respectively, and may be associated with cach of STA 1 and STA 2 of a non-AP STA MLD.

The NSTR AP MLD may include, in a beacon frame transmitted through AP 1 of a primary link, a per-STA profile corresponding to AP 2 (non-primary link), to change the non-primary link to a new channel, and transmit the same. The per-STA profile corresponding to AP 2 may include an (extended) channel switch announcement element and a max channel switch time element, and indicates information related to a time interval in which a TIM frame is transmitted in a new channel after channel switching and a time point at which channel switching starts. The (extended) channel switch announcement element is included in a first beacon frame (beacon #1 of FIG. 19) of a primary link illustrated in FIG. 19, a channel switch count field is configured with 2, and a second beacon frame (beacon #2 of FIG. 19) is configured with 1.

The non-AP STA MLD having received the first and/or the second beacon frame through the primary link may identify the (extended) channel switch announcement element included in the per-STA profile (corresponding to AP 2) of the beacon frame, and may recognize that channel switching (of a new channel) of the non-primary link starts after receiving the second beacon frame and the TIM frame of AP 2 is to be received in a new channel within "x" TUs at a time point at which the second beacon frame is received. In this case, the new channel may be a channel corresponding to a value indicated through a new channel number field included in the (extended) channel switch announcement element. In this case, the "x" TUs may be a time value indicated through a switch time field included in a max channel switch time element included in the per-STA profile (corresponding to AP 2).

Restriction on Operation of Non-AP STA MLD Associated with NSTR AP MLD

An NSTR AP MLD is an AP MLD corresponding to an NSTR link pair of a primary link and a non-primary link. Accordingly, an AP of the non-primary link may be in a BLIND state while PPDU transmission is performed through an AP of the primary link, and on the other hand, the AP of the primary link may be in a BLIND state when the AP of the non-primary link performs the transmission. In this case, the AP of the NSTR AP MLD, having experienced the BLIND state, may need to configure MediumSyncDelay with a pre-configured value.

MediumSyncDelay is a single timer commonly applied to EDCA functions (EDCAFs) of an STA, and when MediumSyncDelay is not 0, an additional constraint may be applied when the corresponding STA acquires a TXOP. In this case, the additional constraint may include that: (1) first transmission attempted to acquire the TXOP needs to be an RTS frame, (2) TXOP acquisition attempts are allowed only a pre-configured number of times while MediumSyncDelay is applied (until MediumSyncDelay is reduced to 0); and (3) a more strict (even lower: for example, -72 dBm to -62 dBm) CCA energy detection (ED) threshold value is utilized compared to a case where MediumSyncDelay is 0. That is, in terms of acquisition of a TXOP, more constraints are applied to an STA having MediumSyncDelay not corresponding to 0 than an STA having MediumSyncDelay corresponding to 0.

Accordingly, even in a case of the NSTR AP MLD, when the AP has experienced the BLIND state, MediumSyncDelay may need to be applied, and it may be difficult for STAs of a BSS to receive a normal service in a situation where channel access of the AP is restricted. The NSTR AP MLD may determine, as a primary link, one of links of the NSTR link pair for operation of the APs by the NSTR AP MLD itself, thereby managing transmission performed in the non-primary link (a link other than the primary link) in a scheme in which the primary link is not in the BLIND state. For example, the NSTR AP MLD may perform transmission in the non-primary link only when transmission is performed in the primary link, thereby managing the primary link not to be in the BLIND state. For such a purpose, even though receiving a frame for requesting a response frame through the AP of the non-primary link, the NSTR AP MLD may not respond with the request response frame. That is, even when receiving the frame for requesting the response frame through the AP of the non-primary link, the NSTR AP MLD may perform an operation of not responding with the response frame. In this case, the reason why the NSTRA AP MLD does not respond with the response frame through the AP of the non-primary link is to prevent the AP of the primary link from being in the BLIND state.

As described above, the NSTR AP MLD may configure the primary link, and may manage operation (transmission) of the AP operating in the primary link and/or the non-primary link so as to prevent the AP of the primary link from being in the BLIND state. Similarly, non-AP STA MLDs associated with the NSTR AP MLD may need to operate while understanding a primary link management method of the NSTR AP MLD. For example, when the non-AP STA MLD recognizes that the NSTR AP MLD does not respond with the response frame in the non-primary link, the non-AP STA MLD may not transmit a frame for requesting a response of the response frame in the non-primary link. In addition, when the non-AP STA MLD fails to receive a response of the response frame from the NSTR AP MLD after transmitting a frame for requesting the response frame in the non-primary link, the non-AP STA MLD may not retransmit the frame for requesting the response for the response frame. For example, when the non-AP STA MLD fails to receive a CTS frame response after transmitting an RTS frame to the NSTR AP MLD through the non-primary link, the non-AP STA MLD may not retransmit the RTS frame. In this case, the non-AP MLD may not attempt to perform transmission through the non-primary link to the NSTR AP MLD until receiving a trigger frame through the non-primary link.

In addition, even though the non-AP MLD has completed a channel access procedure of the non-primary link to perform UL transmission, the non-AP MLD may suspend transmission performed in the non-primary link until a channel access procedure in the primary link is completed. In this case, the method for suspending transmission performed in the non-primary link by the non-AP MLD may correspond to suspending a backoff procedure performed by an STA (more precisely, an EDCAF of the STA) of the non-primary link until a backoff procedure performed by an STA of the primary link is completed. In this case, the method for suspending the backoff procedure performed by the STA of the non-primary link by the non-AP MLD may correspond to maintaining a state in which a backoff counter is 0.

According to the above-described method, the non-AP STA MLD having completed the channel access procedures both in the primary link and the non-primary link may perform simultaneous transmission (simultaneous UL PPDU transmission) in the primary link and the non-primary link. In this case, the meaning of "simultaneous transmission" is that a time point at which each transmission starts is within a pre-configured time interval. However, when only the channel access procedure of the primary link is completed and the channel access procedure of the non-primary link has not completed yet, the non-AP MLD may start PPDU transmission only in the primary link, or may start simultaneous transmission once the channel access procedure of the non-primary link is completed. That is, when performing transmitting to the NSTR AP MLD, the non-AP MLD may perform transmission using the primary link only, or may perform simultaneous transmission using the primary link and the non-primary link. However, the non-AP MLD may not be allowed to perform PPDU transmission to the NSTR AP MLD using the non-primary link only.

In addition, when performing UL transmission to the NSTR AP MLD by utilizing both the primary link and the non-primary link, the non-AP MLD may need to match end time points of transmission performed in both links. In this case, matching the end time points of the transmissions may mean that the transmissions performed in both links end together within a pre-configured time interval.

In addition, when performing UL transmission by the NSTR AP MLD by utilizing both the primary link and the non-primary link, the non-AP MLD may need to make the same configuration for whether PPDUs transmitted in both links request response frames. To described in more detail, both of two UL PPDUs simultaneously transmitted by the non-AP MLD in the primary link and the non-primary link may need to request the response of the response frame, or both of the two UL PPDUs may need not to request the response of the response frame. This may be a restriction applied because when a response frame is transmitted as a response through in a specific link as a result of UL transmission performed utilizing both the primary link and the non-primary link by the non-AP MLD, the AP operating in another link of the NSTR AP MLD may be in the BLIND state. However, only one of two PPDUs (received through the primary link and the non-primary link, respectively) simultaneously received corresponds to a PPDU requesting the response frame, the NSTR AP MLD may not perform the response of the response frame for both of the two PPDUs.

In addition, when performing transmission to the NSTR AP MLD by using both the primary link and the non-primary link, the non-AP MLD may need to make a configuration so that a TXOP of the non-primary link and a TXOP of the primary link end at the same time point, or the TXOP of the non-primary link ends earlier. In other words, the non-AP MLD may need to configure the TXOP of the non-primary link and the TXOP of the primary link to simultaneously end or the TXOP of the non-primary link to end earlier. However, the non-primary link TXOP of the non-AP STA MLD may be allowed to end later by a time within a pre-configured time interval than the TXOP of the primary link.

In addition, the non-AP STA MLD may recognize that the NSTR AP MLD has experienced the BLIND state in the AP of a specific link, and may assist an operation of the AP. To describe in more detail, when recognizing that the NSTR AP MLD has performed transmission only through one link among the primary link and the non-primary link, the non-AP STA MLD may identify that an AP of another link, which has performed no transmission, has experienced the BLIND state. In this case, in consideration that the AP having experience the BLIND state will be restricted in channel access due to MediumSyncDelay not corresponding to 0, the non-AP STA MLD may perform an operation of assisting the AP in releasing MediumSyncDelay (resetting to 0). In this case, the operation performed by the non-AP STA MLD may be an operation using a characteristic that MediumSyncDelay can be released when a NAV configurable PPDU (including a valid MPDU) is received.

For example, the non-AP STA MLD may transmit an assist frame (a type of a PPDU) capable of configuring a NAV to the AP of the NSTR AP MLD, which is determined to have MediumSyncDelay not corresponding to 0 after experiencing the BLIND state. In this case, the assist frame may mean a frame included in the valid MPDU capable of NAV configuration, regardless of the frame format. In this case, a condition that the non-AP STA MLD transmits the assist frame to the NSTR AP MLD through a specific link is restricted to a case where the state of the specific link identified by the non-AP STA MLD is an IDLE state. In this case, another condition that the non-AP STA MLD transmits the assist frame to the NSTR AP MLD is restricted to a case where the non-AP STA MLD is a non-AP STA MLD having explicitly or implicitly received, from the NSTR AP MLD, a request (indication) on transmission of the assist frame.

Figure 20:
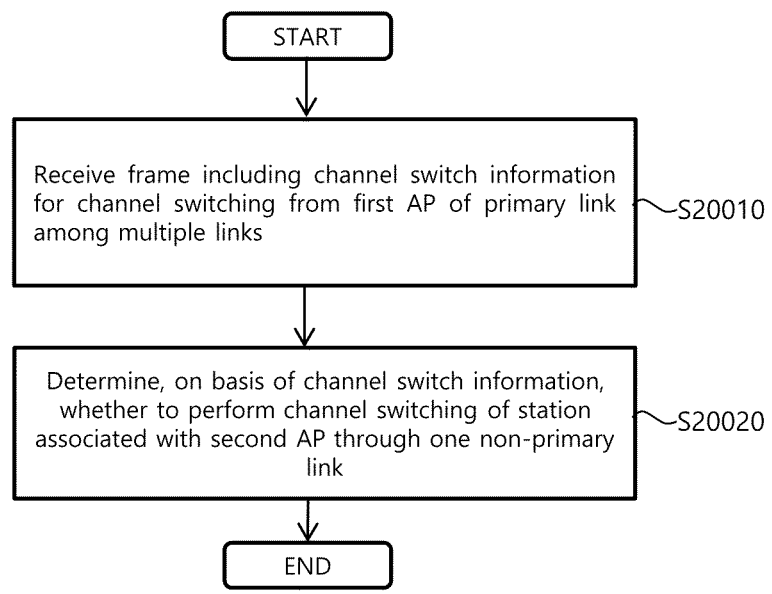
FIG. 20 is a flow chart illustrating an example of an operation of a non-AP MLD according to an embodiment of the present invention.

FIG. 20 is a flow chart illustrating an example of an operation of a non-AP MLD according to an embodiment of the present invention.

Referring to FIG. 20, an MLD including multiple STAs may acquire channel switch information for an AP of a non-primary link from an AP of a primary link of an AP MLD.

Specifically, a multi-link device (MLD) including multiple stations operating in multiple links, respectively, may receive a frame including channel switch information for channel switching from a first AP of a primary link among the multiple links (S20010).

The multiple links include the primary link and one or more non-primary links, and the channel switch information may be used for channel switching of the second AP for one non-primary link among the one or more non-primary links.

Thereafter, the MLD may determine, on the basis of the channel switch information, whether to perform channel switching of a station associated with the second AP through the one non-primary link (S33020).

In this case, second AP channel switch timing-related fields included in the channel switch information may be configured on the basis of the first AP of the primary link.

The fields related to the channel switching of the second AP may be configured on the basis of a target beacon transmission time (TBTT) and a beacon interval (BI) for the first AP of the primary link, and the fields related to the channel switching of the second AP may include a switch time field indicating a time interval in which a first frame is transmitted through a switched channel from a time point at which channel switching is started and/or a channel switch count field indicating the number of TBTTs remaining until the channel switching is started.

The switch time field may be recognized with reference to a time point at which a beacon frame among beacon frames transmitted from the first AP of the primary link is transmitted, wherein a value of the channel switch count field related to the channel switching of the second AP is configured to be "1" or "0".

If the value of the channel switch count field is 1, the channel switching is started at a next TBTT of the first AP after transmission of the frame, and if the value of the channel switch count field is 0, the channel switching may be started after transmission of the frame.

The channel switch information may further include a new channel number field indicating a channel number to be switched through channel switching.

The channel switch information may be included in one or more per-STA profile sub-elements included in the frame, and each of the per-STA profile sub-elements may include information on another AP included in the same MLD.

Each of the first AP and the second AP corresponds to a non-simultaneous transmission and reception station which does not support simultaneous transmission and reception in the same MLD.

The MLD may perform channel switching of the station on the basis of the channel switch information, and may receive a frame related to completion of the channel switching from the first AP or the second AP.

When the second AP corresponds to an AP operating in the non-primary link, the non-AP STA associated with the second AP of the non-primary link may determine not to perform channel switching, and the non-AP STA not performing channel switching may terminate (release or change) multi-link setup with the second AP of the non-primary link. In this case, since the link setup between the AP of the non-primary link and the non-AP STA is released, and thus there is only a single link setup of the primary link between the AP MLD and the STA MLD. Accordingly, the AP MLD and the STA MLD may perform link setup again so as to operate in the primary link only. That is, the AP MLD and the STA MLD may perform link setup again so as to operate in a single link.

If the non-AP STA having link setup with the first AP of the primary link does not performs channel switching for the first AP of the primary link, the non-AP STA of the first AP may select whether to move to another BSS and perform link setup with an AP of another BSS.

The above-mentioned description of the present invention is for illustrative purposes, and it will be understood that those who skilled in the art to which the present invention belongs can easily modify the present invention in other specific forms, without altering the technical ideas or essential characteristics of the present invention. Therefore, the embodiments described above are illustrative and are not limited in all aspects. For example, each element described as a single entity may be distributed and implemented, and likewise, elements described as being distributed may also be implemented in a combined form.

The scope of the present invention is defined by the appended claims rather than the above detailed description, and all changes or modifications derived from the meaning and range of the appended claims and equivalents thereof should be interpreted as being included within the scope of the present invention.

The invention claimed is:

1. A multi-link device (MLD) operating configured to operate in multiple links, respectively, in a wireless communication system, the MLD comprising:
   a communication module; and
   a processor for controlling the communication module, wherein the processor is configured to:
   receive, by a first station(STA) of the MLD, a frame including channel switch information for channel switching through a primary link among the multiple links from a first access point(AP) of an AP MLD associated with the MLD,
   wherein the multiple links comprise the primary link and one or more non-primary links,
   wherein the channel switch information is used for the channel switching performed by a second STA,
   wherein the second STA is associated with a second AP operating on one of the one or more non-primary links, and
   wherein at least one timing field included in the channel switch information for the channel switching of the second AP is set based on the first AP operating on the primary link, and
   choose, by the second STA, whether to perform the channel switching.

2. The MLD of claim 1,
   wherein the at least one timing field includes a Channel Switch Count field indicating a number of target beacon transmission times(TBTTs) until the second AP switches to a new channel, and
   wherein the Channel Switch Count field is set based on a most recent TBTT and a beacon interval(BI) of the first AP.

3. The MLD of claim 2,
   wherein the channel switch information further includes an Max Channel Switch Time element including a Switch Time field indicating an estimated time between a time that the frame is transmitted by the first AP and a time that the channel switching is completed.

4. The MLD of claim 3,
   wherein the Switch Time field is recognized with reference to a time point of transmission of a beacon frame having a value of the Channel Switch Count field related to the channel switching of the second AP among beacon frames transmitted from the first AP of the primary link, the value being configured to be "1" or "0".

5. The MLD of claim 3, wherein the processor is configured to,
   determine whether the channel switching is completed based on the Switch Time field.

6. The MLD of claim 2,
   wherein, when a value of the Channel Switch Count field is 1, the channel switching occurs at a next TBTT of the first AP after transmission of the frame.

7. The MLD of claim 2,
   wherein the channel switch information includes a New Channel Number field indicating a channel number of a new channel to be switched through the channel switching.

8. The MLD of claim 1,
   wherein the channel switch information is included in one or more Per-STA Profile sub-elements included in the frame, and
   wherein each of the one or more Per-STA Profile sub-elements comprises information of another AP affiliated with the AP MLD.

9. The MLD of claim 1,
   wherein the primary link on which the first AP operates and a non-primary link on which the second AP operates among the one or more non-primary links are a non-simultaneous transmission and reception (NSTR) link pair.

10. The MLD of claim 2,
    wherein, when a value of the Channel Switch Count field is 0, the channel switching occurs any time after the frame is transmitted.

11. A method performed by a multi-link device (MLD) operating in multiple links, respectively, in a wireless communication system, the method comprising:
    receiving, by a first station(STA) of the MLD, a frame including channel switch information for channel switching through a primary link among the multiple links from a first access point(AP) of an AP MLD associated with the MLD,
    wherein the multiple links comprise the primary link and one or more non-primary links,
    wherein the channel switch information is used for the channel switching performed by a second STA,
    wherein the second STA is associated with a second AP operating on one of the one or more non-primary links, and wherein at least one timing field included in the channel switch information for the channel switching of the second AP is set based on the first AP operating on the primary link; and choosing, by the second STA, whether to perform the channel switching.

12. The method of claim 11,
wherein the at least one timing field includes a Channel Switch Count field indicating a number of target beacon transmission times(TBTTs) until the second AP switches to a new channel, and wherein the Channel Switch Count field is set based on a most recent TBTT and a beacon interval(BI) of the first AP.

13. The method of claim 12,
wherein the channel switch information further includes an Max Channel Switch Time element including a Switch Time field indicating an estimated time between a time that the frame is transmitted by the first AP and a time that the channel switching is completed.

14. The method of claim 13,
wherein the Switch Time field is recognized with reference to a time point of transmission of a beacon frame having a value of the Channel Switch Count field related to the channel switching of the second AP among beacon frames transmitted from the first AP of the primary link, the value being configured to be "1" or "0".

15. The method of claim 13, the method further comprising:
determining whether the channel switching is completed based on the Switch Time field.

16. The method of claim 12,
wherein, when a value of the Channel Switch Count field is 1, the channel switching occurs at the next TBTT of the first AP after transmission of the frame.

17. The method of claim 12,
wherein the at least one field further includes a New Channel Number field indicating a channel number of a new channel to be switched through the channel switching.

18. The method of claim 11,
wherein the channel switch information is included in one or more Per-STA Profile sub-elements included in the frame, and
wherein each of the one or more Per-STA Profile sub-elements comprises information of another AP affiliated with the AP MLD.

19. The method of claim 11,
wherein the primary link on which the first AP operates and a non-primary link on which the second AP operates among the one or more non-primary links are a non-simultaneous transmission and reception (NSTR) link pair.

20. The method of claim 12,
wherein, when a value of the channel switch count field is 0, the channel switching occurs any time after the frame is transmitted.

* * * * *